(12) United States Patent
Fikes et al.

(10) Patent No.: US 11,021,223 B2
(45) Date of Patent: Jun. 1, 2021

(54) VERSATILE FLEXIBLE AND RECONFIGURABLE VEHICLE SYSTEMS

(71) Applicant: California Institute of Technology, Pasadena, CA (US)

(72) Inventors: Austin C. Fikes, Pasadena, CA (US); Seyed Ali Hajimiri, La Canada, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 0 days.

(21) Appl. No.: 16/664,635

(22) Filed: Oct. 25, 2019

(65) Prior Publication Data

US 2020/0130795 A1 Apr. 30, 2020

Related U.S. Application Data

(60) Provisional application No. 62/751,398, filed on Oct. 26, 2018.

(51) Int. Cl.
| | |
|---|---|
| *B63H 5/15* | (2006.01) |
| *B64G 1/40* | (2006.01) |
| *B63G 8/16* | (2006.01) |
| *B63G 8/22* | (2006.01) |
| *B63G 8/39* | (2006.01) |
| *B64G 1/44* | (2006.01) |

(52) U.S. Cl.
CPC .............. *B63H 5/15* (2013.01); *B63G 8/16* (2013.01); *B63G 8/22* (2013.01); *B63G 8/39* (2013.01); *B64G 1/405* (2013.01); *B64G 1/443* (2013.01); *B63B 2207/02* (2013.01); *B63B 2221/22* (2013.01); *B63B 2221/24* (2013.01); *B63B 2241/08* (2013.01)

(58) Field of Classification Search
CPC ... B63H 5/00; B63H 5/15; B64G 1/40; B64G 1/405; B64G 1/443; B63G 8/00; B63G 8/001; B63G 8/08; B63G 8/16; B63G 8/22; B63G 8/39; B63B 2207/02; B63B 2221/22; B63B 2221/24; B63B 2241/08
USPC .................................. 114/312, 313, 330, 337
See application file for complete search history.

(56) References Cited

U.S. PATENT DOCUMENTS

| | | | |
|---|---|---|---|
| 2014/0374532 A1 | 12/2014 | Duffy et al. | |
| 2015/0136012 A1* | 5/2015 | Williams | B63G 8/08 114/312 |
| 2016/0376000 A1* | 12/2016 | Kohstall | B63G 8/08 114/313 |
| 2016/0378108 A1 | 12/2016 | Paczan et al. | |
| 2018/0088598 A1 | 3/2018 | Lection et al. | |

(Continued)

OTHER PUBLICATIONS

WIPO Application No. PCT/US2019/053614, PCT International Search Report and Written Opinion of the International Searching Authority dated Feb. 27, 2020.

*Primary Examiner* — Lars A Olson
(74) *Attorney, Agent, or Firm* — Alston & Bird LLP

(57) ABSTRACT

Various embodiments are directed to interconnectable tiles configured for operation in an aquatic environment or a near-zero/zero gravity environment. The interconnectable tiles are configured to interconnect relative to one another to form interconnected surfaces, and individual interconnectable tiles provide thrust, ballast, and/or buoyancy to the overall interconnected surface so as to move the interconnected surface in a desired configuration.

31 Claims, 18 Drawing Sheets

(56) References Cited

U.S. PATENT DOCUMENTS

| | | |
|---|---|---|
| 2018/0162528 A1 | 6/2018 | McGrew et al. |
| 2020/0033851 A1 | 1/2020 | Hajimiri |
| 2020/0062398 A1 | 2/2020 | Hajimiri |
| 2020/0094965 A1 | 3/2020 | Hajimiri |

\* cited by examiner

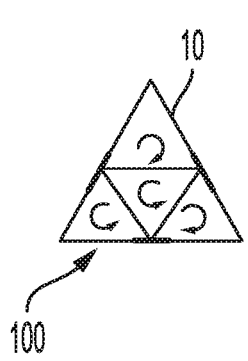 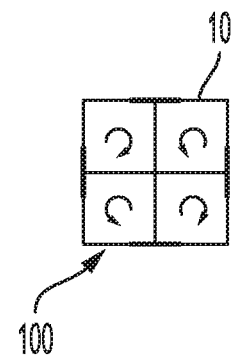 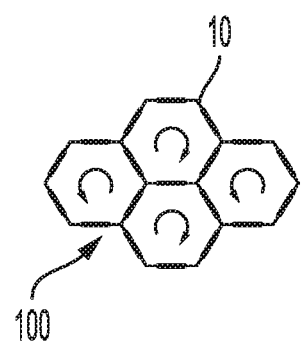 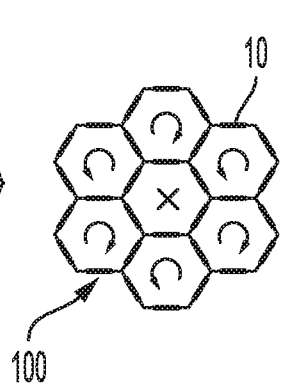
FIG. 10A   FIG. 10B   FIG. 10C   FIG. 10D
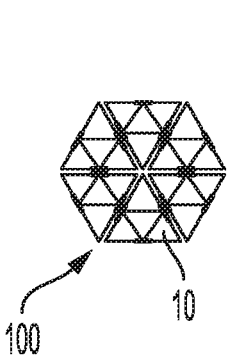 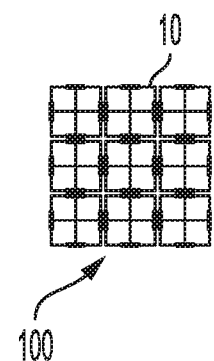 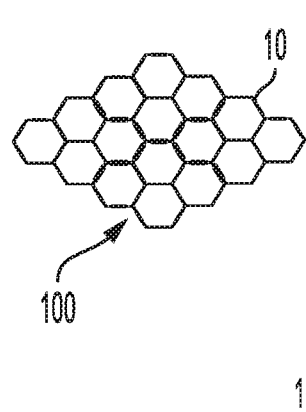 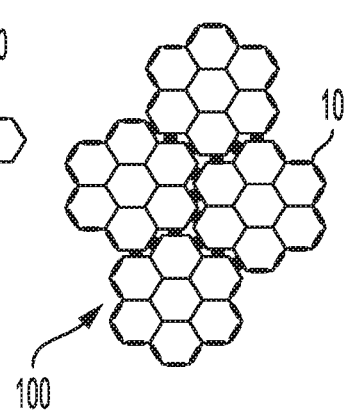
FIG. 10E   FIG. 10F   FIG. 10G   FIG. 10H

VERSATILE FLEXIBLE AND RECONFIGURABLE VEHICLE SYSTEMS

CROSS-REFERENCE TO RELATED APPLICATIONS

This patent application claims priority from U.S. Provisional Appl. Ser. No. 62/751,398, filed Oct. 26, 2018, which is incorporated herein by reference in its entirety.

BACKGROUND

Maneuverable vehicles, such as those operable in marine environments (e.g., submersible vehicles), in zero-gravity environments (e.g., in space), and/or the like have historically relied on centralized, onboard control and power supply units for controlling and/or powering one or more thrust units. This centralized control and power configuration provides practical limits on the overall physical configuration of the vehicle. Furthermore, the thrust units are attached to each other through rigid and permanent connections, which limits the range of operation and behavior. However, these physical limitations also limit potential uses of maneuverable vehicles in these low- or zero-gravity environments, and also limit the flexibility of the apparatus to be configured for specific desired operations.

BRIEF SUMMARY

Various embodiments are directed to individual interconnectable tiles (e.g., neutrally or positively buoyant vehicles in a marine environment and/or vehicles operating in a zero-gravity environment), and interconnected systems of interconnectable tiles forming floating surfaces. The individual interconnectable tile may be entirely self-sufficient, having controllers, power units (e.g., batteries, wireless power receivers, and/or the like), and thrust units onboard each interconnectable tile. The interconnectable tiles comprise connectors thereon for interconnecting a plurality of interconnectable tiles to form a floating surface, and the controllers of the interconnectable tiles are configured for decentralized control of an interconnected floating surface 100 to perform various operations. Moreover, methods of operating the individual interconnectable tiles and/or the floating surfaces utilize the decentralized control configuration enabled by the plurality of controllers associated with respective interconnectable tiles to dynamically reconfigure the floating surfaces in accordance with a desired functionality of the floating surfaces.

Certain embodiments are directed to a submerging interconnectable tile operable within a liquid. In various embodiments, the interconnectable tile comprises: a frame defining opposing open ends and having one or more connectors configured to engage external connectors of at least one adjacent interconnectable tile to form a joint between the frame and the at least one adjacent interconnectable tile; a thrust unit secured within the frame and configured to provide thrust for the submerging tile at least in part by pulling liquid through the opposing open ends of the frame; a controller secured within the frame and configured to transmit control signals to the thrust module; and one or more shutters operably connected with the, wherein the one or more shutters are configurable between one or more open positions and a closed position to at least partially seal an open end of the opposing open ends of the frame to dynamically control fluid dynamic interactions with a liquid.

In certain embodiments, the submerging interconnectable tile further comprises a buoyancy adjustment system configured to change the buoyancy of the submerging interconnectable tile. Moreover, in various embodiments the one or more shutters are embodied as one or more first shutters operably connected with the frame at a first open end of the opposing open ends of the frame, wherein the interconnectable tile further comprises one or more second shutters operably connected with the frame at a second open end of the opposing open ends of the frame, and wherein the one or more first shutters and the one or more second shutters are collectively configured to at least partially seal an interior of the frame defined between the opposing open ends. In certain embodiments, the submerging interconnectable tile further comprises an acoustic-based communication system in communication with the controller. In various embodiments, the submerging interconnectable tile further comprises SONAR sensing components in communication with the controller.

In certain embodiments, the thrust unit is secured within the frame via one or more attitude adjustment mechanisms configured to provide vectored thrust control within the interconnectable tile. In various embodiments, the one or more connectors are configured to form a rigid joint when engaged with external connectors of at least one adjacent interconnectable tile. In certain embodiments, the one or more connectors are configured to form a flexible joint when engaged with external connectors of at least one adjacent interconnectable tile. Moreover, the one or more connectors may be configured to form a dynamically adjustable joint when engaged with external connectors of at least one adjacent interconnectable tile, wherein the dynamically adjustable joint has a dynamically controllable rigidity.

In various embodiments, the controller is configured to provide control signals to the thrust unit based at least in part on master control signals received by the controller. Moreover, in certain embodiments, the one or more connectors comprise physical data connectors, and the controller is configured to communicate with controllers of connected adjacent interconnectable tiles via the physical data connectors.

Various embodiments are directed to a submerging interconnected surface comprising: a plurality of submerging interconnectable tiles each comprising: a frame having one or more connectors configured to engage external connectors of at least one adjacent interconnectable tile to form a joint between the frame and the at least one adjacent interconnectable tile; an independently controllable thrust module; a controller secured within the frame and configured to transmit control signals to the thrust module and to communicate with other interconnectable tiles within the interconnected surface via one or more communication protocols.

In certain embodiments, the frame of each of the plurality of submerging interconnectable tiles define opposing open ends, and each of the plurality of interconnectable tiles further comprise one or more first shutters operably connected with the frame at a first open end of the opposing open ends of the frame, wherein the one or more first shutters are configurable between: one or more open positions to provide attitude adjustment for the interconnectable tile while liquid is moving through the opposing open ends of the frame; and a closed position to at least partially seal the first open end of the frame to dynamically control fluid dynamic interactions with liquid.

In various embodiments, the controller of at least one of the plurality of interconnectable tiles is configured to configure the first shutters to a closed configuration to provide decreased drag across a face of the submerging interconnected surface. Moreover, the independently controllable thrust modules of each of the plurality of interconnectable tiles comprise at least one marine propeller. In certain embodiments, the controllers of the plurality of interconnectable tiles are collectively configured to depower at least one of the independently controllable thrust units. In certain embodiments, each of the interconnectable tiles additionally comprise a buoyancy control system, and wherein the controllers of the plurality of interconnectable tiles are collectively configured to modify the buoyancy of the submerging interconnected surface by independently operating the buoyancy control systems of the plurality of interconnectable tiles. In various embodiments, each of the interconnectable tiles further comprises an onboard power supply. Moreover, adjacent interconnectable tiles of the plurality of interconnectable tiles may be connected via a flexible joint.

In various embodiments, adjacent interconnectable tiles of the plurality of interconnectable tiles are connected via a rigid joint. Moreover, adjacent interconnectable tiles of the plurality of interconnectable tiles may be connected via a dynamically adjustable joint.

Certain embodiments are directed to an interconnected surface configured for operation in a zero-gravity environment, the interconnected surface comprising: a plurality of interconnectable tiles configured for operation in a zero-gravity environment, wherein each interconnectable tile of the plurality of interconnectable tiles comprises: a frame having one or more connectors configured to engage external connectors of at least one adjacent interconnectable tile to form a joint between the frame and the at least one adjacent interconnectable tile; an independently controllable thrust module operable within a zero-gravity environment; a controller secured within the frame and configured to transmit control signals to the thrust module and to communicate with other interconnectable tiles within the interconnected surface via one or more communication protocols.

In various embodiments, the independently controllable thrust modules of each of the plurality of interconnectable tiles comprises an ion drive. Moreover, adjacent interconnectable tiles of the plurality of interconnectable tiles may be connected via a flexible joint. In certain embodiments, adjacent interconnectable tiles of the plurality of interconnectable tiles are connected via a rigid joint. In various embodiments, adjacent interconnectable tiles of the plurality of interconnectable tiles are connected via a dynamically adjustable joint. In certain embodiments, the thrust unit of each of the plurality of interconnectable tiles is secured within the frame via one or more attitude adjustment mechanisms configured to provide vectored thrust control within the interconnectable tile. According to certain embodiments, one or more of the plurality of interconnectable tiles comprises a photovoltaic energy production system.

In various embodiments, one or more of the plurality of interconnectable tiles comprises at least one of a radio-frequency or microwave transceiver. In certain embodiments, the controllers of the plurality of interconnectable tiles are collectively configured to depower at least one of the independently controllable thrust units. Moreover, in various embodiments, each of the interconnectable tiles further comprises an onboard power supply.

BRIEF DESCRIPTION OF THE SEVERAL VIEWS OF THE DRAWINGS

Reference will now be made to the accompanying drawings, which are not necessarily drawn to scale, and wherein:

FIGS. 10A-10H illustrate various interconnected surface 100 configurations according to certain embodiments.

DETAILED DESCRIPTION

Figure 1:
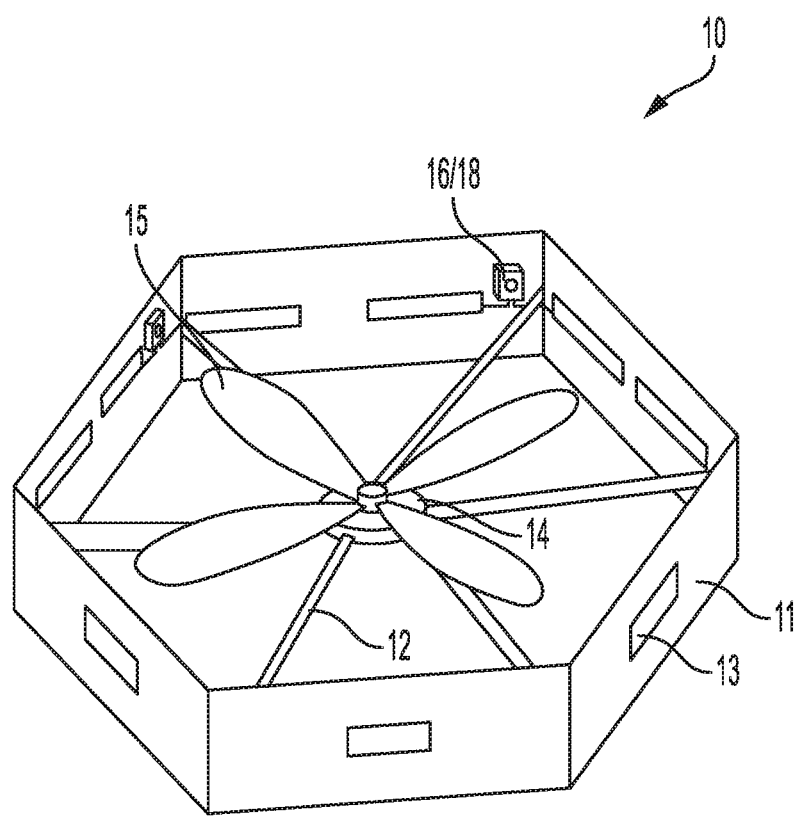
FIG. 1 is a schematic illustration of interconnectable tile in accordance with certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments are directed to submerging tiles (e.g., unmanned submersible vehicles) and other interconnectable tiles operable in various environments, (e.g., floating vehicles operable in low gravity environments such as sub-marine environments, or zero-gravity environments such as space environments). In accordance with various embodiments, such submerging vehicles and/or other interconnectable tiles may be configured to operate in concert with one another as interconnectable tiles comprising connectors enabling interconnection between adjacent interconnectable tiles to form a submersible surface (or other floating surface). Each interconnectable tile may be entirely self-sufficient, with one or more onboard thrust units optimized for the particular environment of intended operation, one or more onboard controllers, one or more onboard power units, one or more onboard attitude control mechanisms (e.g., operably movable thrust units and/or control surfaces positioned adjacent thrust units), and/or other features (e.g., sensors, transmitters/receivers, and/or the like). Moreover, certain interconnectable tiles may comprise one or more features operable only when operating in combination with a plurality of interconnectable tiles (e.g., as an interconnected floating surface), such as surface shutters for selectably reconfiguring an interconnectable tile to modify the fluid dynamics across a face of a floating surface (collectively defined by ends of connected interconnectable tiles) and/or to reconfigure an interconnectable tile as a ballast and/or float for an overall floating surface, one or more signal reflectors configured to amplify the signal receptivity of a receiver of one interconnectable tile within an interconnected floating surface, and/or the like.

As discussed herein, the interconnectable tiles may be configured for operation within a swarm (or school) of a plurality of physically separate interconnectable tiles and/or within an interconnected floating surface (e.g., a submerging surface or a zero/near-zero gravity surface). In various embodiments, the floating surface may be a rigid floating surface (e.g., an at least substantially planar floating surface, configured as a raft, a hull-shaped floating surface (e.g., having a deep-V shaped hull of a boat), a torpedo-shaped rigid floating surface optimized for submarine travel, and/or the like) characterized by rigid joints between interconnected interconnectable tiles. In other embodiments, the floating surface may be embodied as a flexible floating surface (also referred to herein as a floating shroud) characterized by flexible joints between interconnected interconnectable tiles. As noted, each interconnectable tile may be characterized by its own positive buoyancy characteristics, such that joints between interconnected interconnectable tiles need not be fluid tight to maintain a desired buoyancy characteristic of the overall floating surface.

In certain embodiments, the joints of a floating surface (a joint comprising a connector of each of two interconnected interconnectable tiles) may be controllable between a rigid and flexible configuration (e.g., a digital configuration, selectable between rigid or flexible configurations or a variable configuration, selectable between varying degrees of rigidity).

While forming a portion of a floating surface, the interconnectable tiles' onboard controllers may be configured to control the movement/operation of the floating surface in a distributed control configuration. Each controller may operate independently to determine appropriate control signals for control of a respective interconnectable tile and/or for determining an optimal quantity of interconnectable tiles for generating a thrust output for the overall floating surface, for example, based on a determined desired movement pattern/operation of the floating surface as a whole and/or based on a connectivity state of the interconnectable tile (e.g., indicating whether the interconnectable tile is attached to another, adjacent interconnectable tile and/or indicating the position of the interconnectable tile within a floating surface). The controllers can also use additional information from on board sensors (e.g., microelectromechanical systems (MEMS) accelerometers, gyroscopes, magnetometers, depth gauges, miniaturized sonar, radar, LIDAR, GPS, visible and infrared imagers and cameras, and/or the like) to appropriately control a interconnectable tile and/or floating surface. In other embodiments, one or more controllers of individual interconnectable tiles may be configured to operate as slave controllers, executing control commands received from a separate master controller (which may be embodied as a controller of another interconnectable tile, or a separate controller device).

In practice, a plurality of interconnectable tiles may launch (e.g., into a submerged marine environment, into a zero-gravity environment, and/or the like) as individual vehicles or as an interconnected floating surface, or any combination thereof. The interconnectable tiles may reconfigure during operation (e.g., by attaching relative to one another to form a floating surface and/or by detaching from one another into a swarm or otherwise into a plurality of separate interconnectable tiles).

Interconnectable Tile

FIG. 1 illustrates an example interconnectable tile 10 according to various embodiments. As discussed herein, an interconnectable tile 10 may be embodied as a submerging vehicle operable in a marine environment. As another example, an interconnectable tile 10 may be embodied as a vehicle operable within a near-zero/zero-gravity environment, such as a spacecraft. The interconnectable tiles 10 may be unmanned vehicles configured for at least partially autonomous operation in certain embodiments. In certain embodiments, one or more interconnectable tiles 10 may have one or more features as discussed in co-pending U.S. patent application Ser. No. 16/586,549, filed on Sep. 27, 2019, the contents of which are incorporated herein by reference in their entirety.

Moreover, those interconnectable tiles 10 operable as submerging interconnectable tiles for operation within a marine environment may have a neutral buoyancy within water (e.g., within freshwater, within sea water, and/or the like). As discussed herein, in certain embodiments the buoyancy of a submerging interconnectable tile 10 may be adjustable via a buoyancy control system, comprising ballast tanks, floats, selectably fillable chambers, and/or the like, operable together with fluid pumps for moving fluid into and/or out of the ballast tanks, floats, selectably fillable chambers, and/or the like so as to change the buoyancy of the interconnectable tile 10 (e.g., facilitating sinking or rising within the marine environment).

With reference to FIG. 1, an interconnectable tile 10 may comprise a frame 11 supporting a plurality of subcomponents therein. The frame 11 may comprise a plurality of surfaces optimized for operation within a particular fluid. For example, the frame of a submerging tile may be optimized for low drag within a liquid (e.g., water). Moreover, as discussed herein, the frame may be sealed to impede fluid ingress/egress therethrough, such that selectably sealing the interior of the interconnectable tile 10 may define a fluid tight enclosure. As shown in FIG. 1, the frame 11 may comprise one or more outer walls (collectively defining a housing) defining an outer perimeter of the interconnectable tile 10. The one or more outer walls may define an exterior surface (defining an exterior surface of the interconnectable tile 10) and an interior surface (surrounding an interior of the interconnectable tile 10). As shown in FIG. 1, the outer walls may be configured in a hexagon configuration, although any of a variety of shapes may be utilized. For example, as shown in FIGS. 2A-2E, discussed in greater detail herein, the outer walls may be configured in a rectangular (e.g., square) configuration. Other example outer wall configurations encompass round (also referred to herein as circular) configurations, oval-shaped configurations, elliptical configurations, triangular configurations, pentagon-shaped configurations, and/or the like. Moreover, although the illustrated embodiment encompasses at least substantially planar walls, it should be understood that individual walls of the frame (or housing) may be any of a variety of shapes. For example, individual walls may have an at least substantially elliptical shape so as to lower fluid drag of the interconnectable tile 10 travelling through a fluid.

As shown in FIG. 1, the frame 11 may define an open upper end and/or an opposing open lower end, enabling fluid flow through the frame 11 (e.g., water flow for embodiments operable in a submarine environment, fuel exhaust for embodiments operable in a vacuum (e.g., within a near-zero/zero gravity environment of space). In certain embodiments, a protective mesh, grid, surface, or other sheet (e.g., a flexible sheet or rigid sheet) that does not substantially impede fluid flow through the frame 11 may cover the open upper end and/or the open lower end, such as to provide protection against user contact with the thrust unit within the frame 11. The grid can also be used to impart certain aerodynamic properties to the fluid flow (e.g., laminar flow) or modify the airflow. As discussed herein, an interconnectable tile 10 may comprise one or more control surfaces, such as selectably operable shutters to modify air flow through and/or across an interconnectable tile 10, and a grid, surface, protective mesh, and/or the like may be embodied as control surfaces providing attitude control of the interconnectable tile 10. In certain embodiments, the shutters may be configured to selectably seal an interior of the interconnectable tile 10 to create a fluid-tight embodiment for example, to utilize an individual interconnectable tile 10 within an interconnected surface as ballast, as additional buoyancy, and/or the like.

The one or more outer walls may be solid panels, mesh panels, interconnected tubes, interconnected rods, a hollow frame, and/or the like. As discussed herein, the one or more outer walls are optimized for the environment in which the interconnectable tile 10 is configured for operation. For example, a submerging tile may have solid sidewalls so as to enable the interior of the tile to be selectably sealed. In near-zero/zero-gravity tiles, the one or more sidewalls may be embodied as a mesh/grid, or as solid sidewalls in embodiments configured to create a fluid-tight enclosure within an interconnectable tile 10. The one or more outer walls may be configured to operate as fluid foils to direct fluid through the interconnectable tile 10 in certain embodiments. The outer walls can also be used to induce control action by acting as primary or secondary control surfaces.

Moreover, the frame 11 may comprise one or more structural supports, such as cross-braces 12 extending across the interior of the interconnectable tile 10. As shown in FIG. 1, the structural supports may be configured to support one or more subcomponents, such as thrust units, controllers, and/or the like as discussed herein. The structural supports may each extend entirely across the interior of the interconnectable tile 10, or the structural supports may extend between an interior surface of an outer wall to a portion of a subcomponent (e.g., to a portion of a thrust unit).

The frame 11 may comprise rigid and/or flexible materials in certain embodiments. For example, the entirely of a frame 11 may comprise rigid materials, thereby providing a fully rigid interconnectable tile 10. In other embodiments, such as certain embodiments operable in a near-zero/zero gravity environment, at least a portion of a frame 11 may comprise flexible materials (e.g., reflective foils), thereby providing intra-vehicle flexibility for an interconnectable tile 10 (and an interconnected surface encompassing such an interconnectable tile 10). As examples, the frame 11 of an interconnectable tile 10 may comprise any of a plurality of materials, such as carbon fiber, magnesium, titanium, aluminum, polyimide, enforced rubber, fiber glass, plastics, polymer materials, and/or the like. As just one example, the one or more outer walls may comprise a first material, and one or more structural supports may comprise a second material. As another example, all components of the frame 11 may comprise a single material.

Figure 2B:
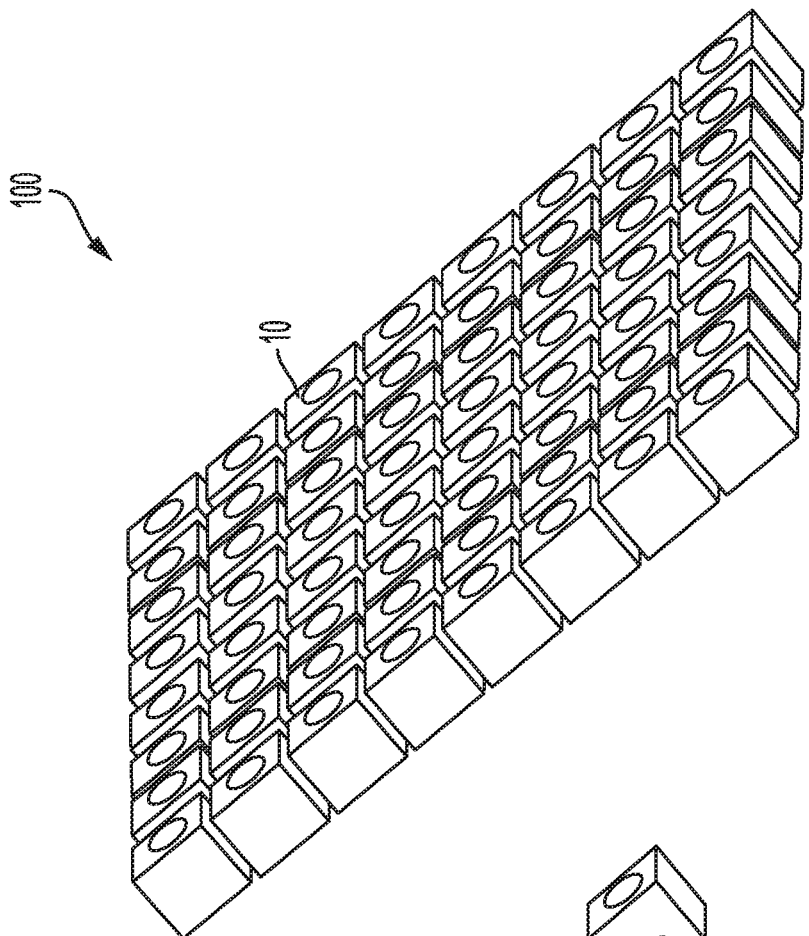
FIGS. 2A-B are schematic illustrations of a floating surface arranged in a rectangular configuration in accordance with certain embodiments.
Figure 2A:
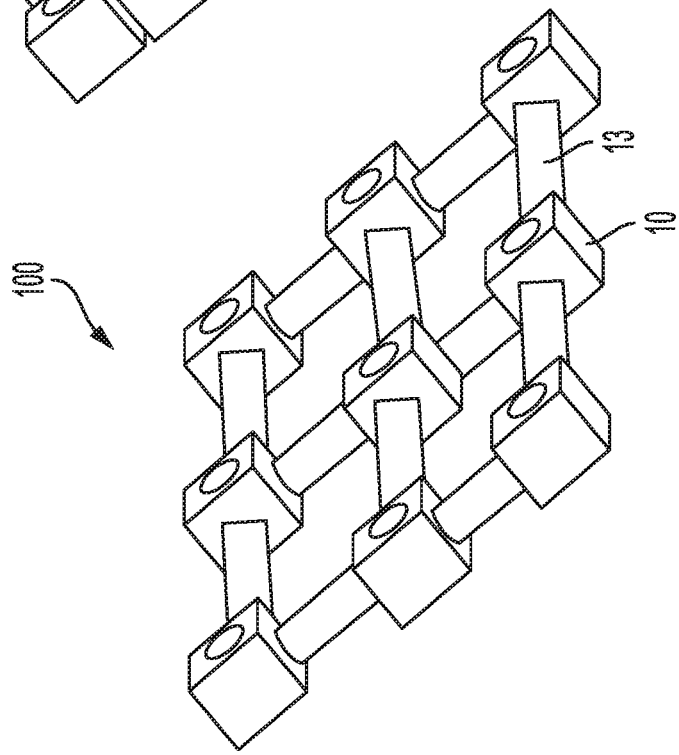

Moreover, as shown in FIG. 1, the interconnectable tile 10 comprises one or more connectors 13 positioned on an exterior surface of the outer walls and configuring the interconnectable tile 10 as an interconnectable tile. As just one example, the connectors 13 may be positioned at regular intervals around an exterior perimeter of the interconnectable tile 10. As a specific example, each individual outer wall may comprise at least one connector 13. As another example, an outer wall may comprise a plurality of connectors 13 spaced along a length of the outer wall (e.g., a circular interconnectable tile 10 comprising a single, continuously curved outer wall may comprise a plurality of connectors 13 spaced at regular intervals around the perimeter of the interconnectable tile 10, or a ring connect capable of connecting at any point along its outer perimeter). With respect briefly to FIGS. 2A-2B, the connectors 13 may be configured to provide a close connection between connected tiles, as shown in FIG. 2B (such that the gaps between adjacent interconnectable tiles 10 are minimal and smaller than the size of a particular tile), or the connectors 13 of certain embodiments may be configured to provide a distant connection between connected tiles, as shown in FIG. 2A (such that the gaps between adjacent interconnectable tiles 10 permit a substantial amount of fluid to flow around each tile, and the gaps may be larger than the size of a particular tile).

In certain embodiments, the connectors 13 may each be identified by a connector identifier indicative of the relative location of the connector on the interconnectable tile 10. The connector identifiers may be stored within the controller 18 of the interconnectable tile 10 (e.g., a memory of the controller 18), such that the controller 18 is enabled to determine where interconnected interconnectable tiles 10 are connected relative to the particular interconnectable tile 10. For example, the connector identifiers may comprise "left," "right," "front," and "back" (the names may be arbitrarily assigned, as the interconnectable tile 10 may be capable of identical performance of operation in any direction), such that a controller 18 may determine whether other interconnectable tiles 10 are connected, for example, on a single side of the interconnectable tile 10, on adjacent (e.g., perpendicular) sides of the interconnectable tile 10, on opposite sides of the interconnectable tile 10, on all sides of the interconnectable tile 10, and/or the like.

In certain embodiments, the connectors 13 may comprise hermaphrodite connectors, such that identical connectors 13 are configured for interconnection to form a joint therebetween. Thus, each connector 13 on each interconnectable tile 10 may be capable of forming a joint with every other connector 13 of other interconnectable tiles 10. However, it should be understood that the connectors 13 may be embodied as male-style connectors and female-style connectors, such that a male-style connector is configured for interconnection with a female-style connector to form a joint.

In certain embodiments, the connectors 13 may be configured for interconnection therebetween without external intervention. Such connectors 13 may be engaged to interconnect between connectors 13 by minimal pressure that may be generated by controlling the movement of two interconnectable tiles 10 toward one another. The connectors may be pressure-fit style connectors, snap-fit style connectors, interference-fit style connectors, static magnetic connectors or electrically controlled magnetic (e.g., electromagnetic connectors), and/or the like. In certain embodiments, joints formed between connector pairs (comprising a first connector of a first interconnectable tile 10 and a second connector of a second interconnectable tile 10) may be separated without external intervention. As an example, a specific relative movement pattern of connected interconnectable tiles 10 may be utilized to disconnect a joint (e.g., a first interconnectable tile 10 moving in a downward direction and a second interconnectable tile 10 moving in an upward and twisting direction). As another example, an actuator on one interconnectable tile 10 disengaging a corresponding engagement component on a second interconnectable tile 10. In other embodiments however, joints formed between connector pairs may be separated only with external aid (e.g., a user/tool interacting with portions of the joint to separate the connectors). In yet other embodiments the joints may be formed or facilitated using electromagnets that may be activated to form a connection between adjacent interconnectable tiles 10 and turned off to disengage previously connected adjacent interconnectable tiles 10. Such magnetic connectors may be aided by miniaturized magnetic sensors on the outer wall that are configured to detect the magnetic field of the adjacent interconnectable tiles 10 and provide feedback in the alignment and attachment process.

In certain embodiments, the connectors 13 may be passive connectors that do not utilize/require power to form joints. For example, snap-fit connectors, hook-and-loop connector/fasteners, static magnetic connectors, and/or the like may form joints between connectors 13 simply based on pressure applied between connectors. In other embodiments, the connectors 13 may comprise active connectors that utilize power to form joints. For example, actuated pin joints may utilize an actuator (e.g., a linear actuator, a motor, a solenoid, and/or the like) to interconnect connectors 13 to form a joint. As another example, electromagnetic connectors may maintain joints in a connected configuration until depowering of the electromagnetic connector or be used as means of achieving adjustable stiffness by controlling the magnetic field strength. In yet other embodiments, the connectors 13 may comprise semi-active connectors that utilize power to separate joints but do not utilize power to form joints. For example, interlocking pin joints may be formed between connectors 13 simply based on minimal pressure formed between connectors 13, however an integrated actuator may be utilized to separate the connectors 13 of the joint. It should be understood that other semi-active connectors utilize power to form joints but do not utilize power to separate joints.

In certain embodiments, the connectors 13 may comprise a rigid material, such as a metal material, a rigid polymer, and/or the like, and may be configured to generate rigid joints between connected interconnectable tiles 10. In other embodiments, the rigid material connectors may be configured to generate flexible, hinged or pinned joints between connected interconnectable tiles 10. In yet other embodiments, the connectors 13 may comprise flexible or resilient materials, such as composite materials, memory metals, rubber materials, flexible polymer materials, and/or the like, such that the connectors 13 are configured to generate flexible joints between connected interconnectable tiles 10. In yet other examples, the connectors 13 may be embodied as dynamically adjustable joints with a dynamically controllable rigidity. For example, dynamically adjustable joints may comprise dynamically adjustable materials and/or joint configurations having adjustable rigidity (e.g., by applying an electrical signal to the material, by moving a rigid component within the connector 13, by tightening/loosening a pivot joint to increase/decrease frictional forces within a joint, and/or the like). Moreover, as discussed herein, the connectors 13 may comprise conducting components configured for power transmission and/or data transmission between connected interconnectable tiles 10 (e.g., between controllers of connected interconnectable tiles 10).

In various embodiments, the connectors 13 may comprise proximity sensors, pressure sensors, contact sensors, magnetic field sensors, and/or the like to facilitate reconfiguration between adjacent, connected interconnectable tiles 10. In other embodiments, such sensors may be positioned at one or more locations on an outer surface of an interconnectable tile 10 (e.g., adjacent connectors 13). For example, proximity sensors may be configured to detect the presence of a nearby interconnectable tile 10 for which connection is desired, and/or to measure the distance to a face of the detected interconnectable tile 10, and/or relative orientation or conformation. Thus, a controller of an interconnectable tile 10 as discussed herein is configured to utilize outputs of a proximity sensor (or other sensor type) to determine appropriate control maneuvers for the interconnectable tile 10 to enable connection with another interconnectable tile 10. Pressure sensors and/or contact sensors (e.g., positioned within and/or adjacent connectors 13) may be used to confirm connection between interconnectable tiles 10.

As shown in FIG. 1, the interconnectable tile 10 additionally comprises a thrust unit, embodied as a motor 14 and propeller 15 (e.g., for submerging tiles 10) in the illustrated embodiment, although other thrust units may be utilized in certain embodiments (e.g., a fossil fuel-based engine and propeller, a fluid-jet propulsion unit, an ion-drive unit, and/or the like). As illustrated in FIG. 1, the thrust unit is secured within the frame 11 of the interconnectable tile 10 (e.g., secured relative to structural supports extending across at least a portion of the interior of the interconnectable tile 10). As just one example, the structural supports may extend between interior surfaces of side walls of the frame 11 to a housing of a motor of the thrust unit (e.g., a motor associated with a propeller of the thrust unit). In certain embodiments, the thrust unit may be rigidly secured within the interconnectable tile 10, such that the thrust unit cannot pivot within the interconnectable tile 10. However, in other embodiments, the thrust unit may be pivotably mounted within the interconnectable tile 10, such that the thrust unit may provide attitude control for the interconnectable tile 10, as well as other multi-dimensional movement control. In embodiments in which the thrust unit is pivotably mounted within the interconnectable tile 10, the pivoting position of the thrust unit may be controlled via an onboard controller (e.g., via one or more motors (e.g., servo motors) controlled by the onboard controller). In such embodiments, the thrust unit may be secured within a two-dimension rotatable support, pinned within the frame of the interconnectable tile 10. In certain embodiments, each dimension of rotation may be individually controllable by a motor (e.g., a direct-drive motor, a gear-drive motor, an/or the like), which may be configured to receive control signals from an onboard controller. As yet other embodiments, attitude control may be performed by a plurality of separately usable thrust units within a single interconnectable tile 10, each thrust unit may have a different angle of operation, such that separate operation of the thrust units cause the interconnectable tile 10 to adjust direction of travel and/or orientation.

Figure 2E:
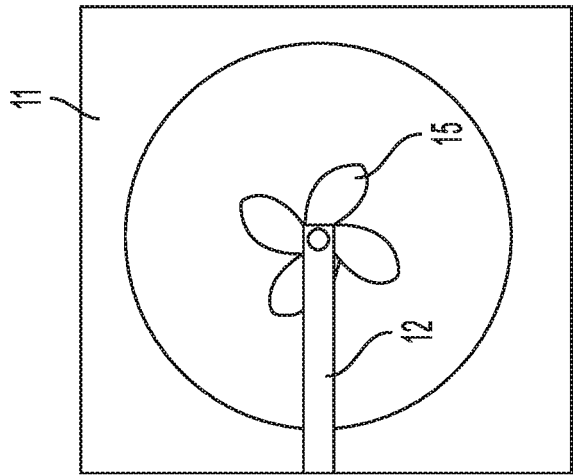
FIGS. 2C-2H are schematic illustrations of interconnectable tiles in various configuration in accordance with certain embodiments.
Figure 2D:
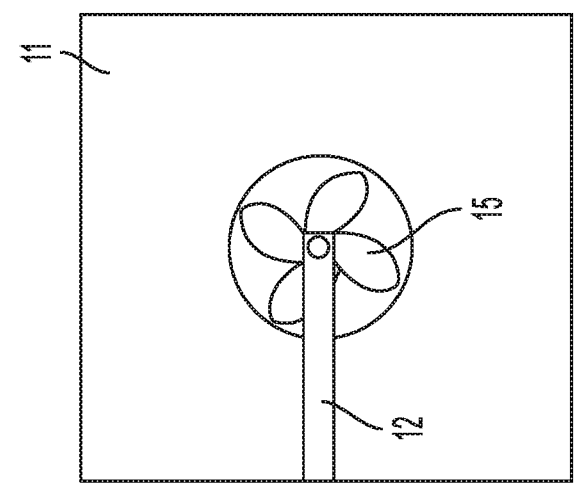
Figure 2C:
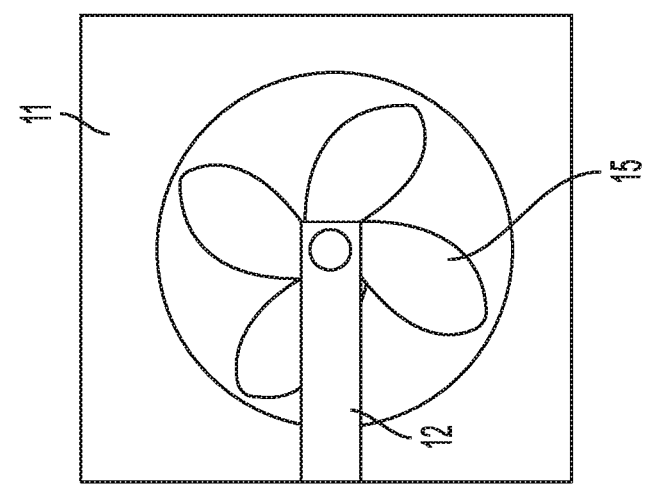

With reference briefly to FIGS. 2C-2E, the thrust unit and central opening (defining the interior of the interconnectable tile 10) may have any of a variety of proportional sizes relative to the interconnected tile 10. For example, as shown in FIGS. 2C-2D, a propeller 15 of a thrust unit may have a size at least substantially corresponding to the size of the central opening. As another example as shown in FIG. 2E, a propeller 15 of a thrust unit may have a size substantially smaller than the corresponding central opening. The relative size of the central opening and thrust unit components (e.g., propeller 15) may be selected so as to provide desired thrust and/or drag characteristics of certain embodiments).

In other embodiments, it should be understood that an interconnectable tile 10 may comprise one or more control components to provide separate attitude control for the interconnectable tile 10. For example, the interconnectable tile 10 may comprise one or more control surfaces, such as rudders, trim flaps, shutters (as illustrated for example, in FIG. 4B-4C and discussed herein) and/or other control surfaces that may be operably secured relative to an open upper end or an open lower end of the interconnectable tile 10 so as to modify fluid flow generated by the thrust unit, thereby enabling control of the interconnectable tile 10 by adjustment of the control surfaces. The control surfaces may be operable by motors, solenoids, or other mechanical movement mechanisms in communication with the onboard controller 18, thereby enabling independent movement of the control surfaces so as to provide attitude control for an interconnectable tile 10. As discussed in greater detail herein, the control surfaces of one or more interconnectable tiles 10 may be utilized in combination with other, separate interconnectable tiles 10 (such as a plurality of interconnectable tiles 10 arranged in a single interconnected surface 100) so as to provide additional attitude control for the plurality of interconnectable tiles 10, such as within a single interconnected surface 100. In such embodiments, a plurality of interconnectable tiles 10 may be arranged in multiple layers (e.g., an interconnected surface 100 may comprise one or more interconnected surfaces 100 arranged in multiple layers (e.g., utilizing flexible joints) such that the interconnectable tiles 10 of a first layer may operate as control surfaces for interconnectable tiles 10 within a second layer. In such embodiments, one or more interconnectable tiles 10 within the first layer are deactivated, such that only the included control surfaces are used, specifically to provide attitude control for thrust provided by interconnectable tiles 10 within the second layer.

Figure 2F:
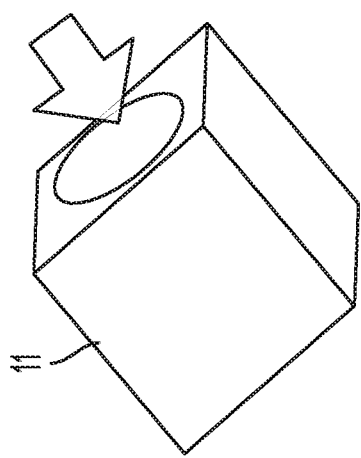
Figure 2G:
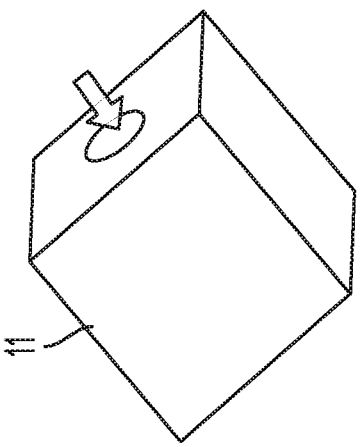
Figure 2H:
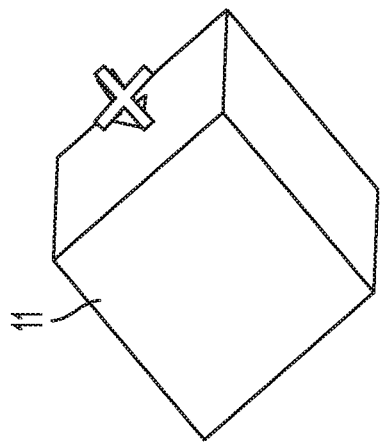
Figure 3A:
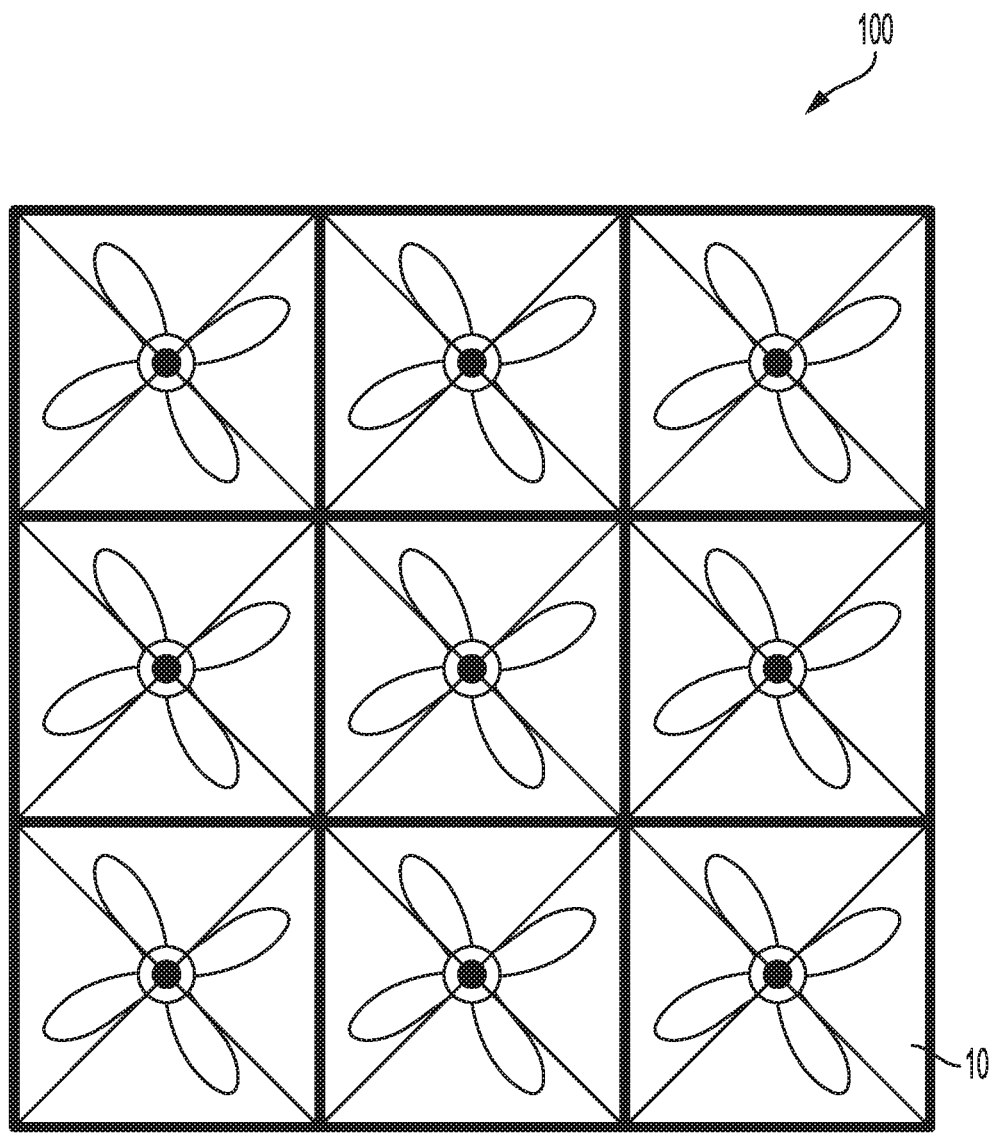
FIGS. 3A-3B are schematic representations of various arrangements of interconnectable tiles connected to form floating surfaces according to certain embodiments.
Figure 3B:
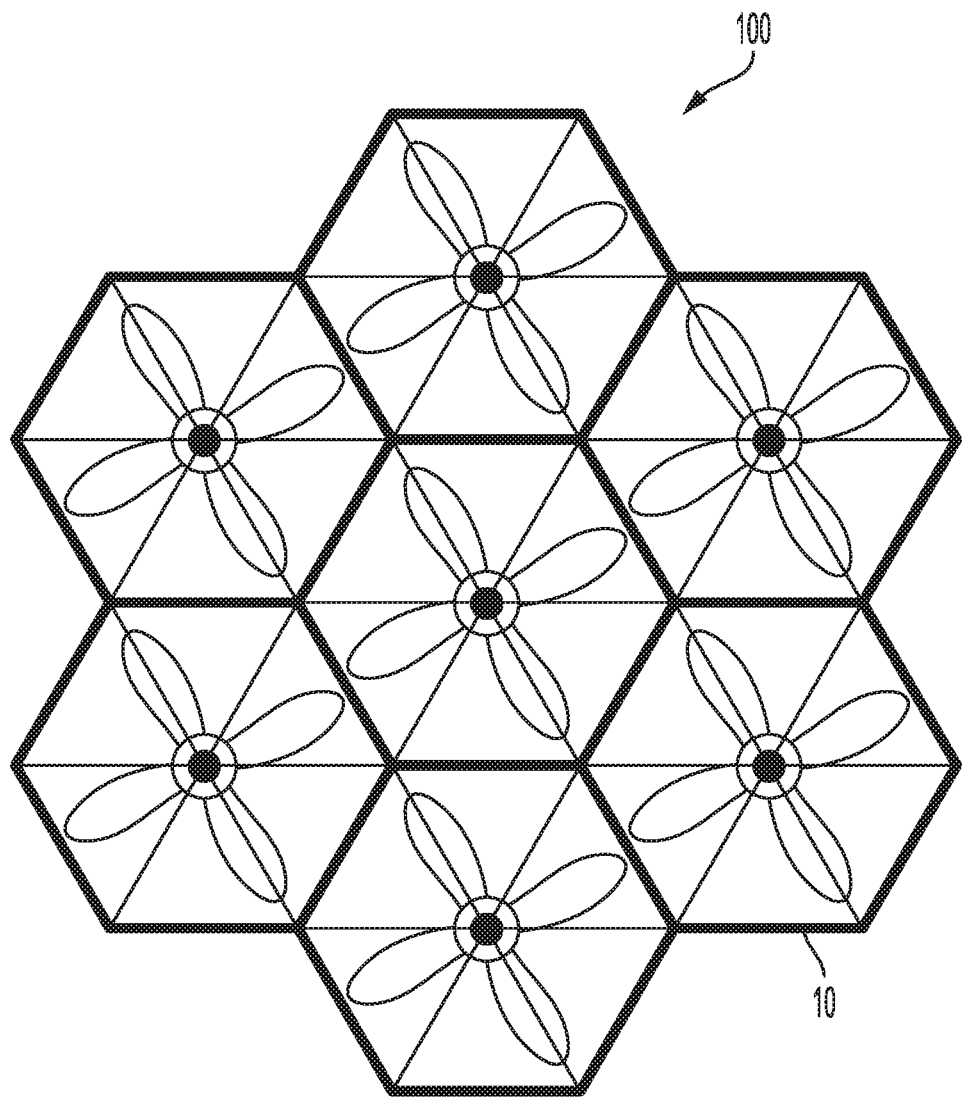

In certain embodiments, the control surfaces may be embodied as shutters configurable between an open and a closed configuration. Such shutters may be operably secured at an open upper end or an open lower end of the interconnectable tile 10. In certain embodiments, a plurality of shutters may be operably secured at the open upper end and/or open lower end of the interconnectable tile 10. While in the open configuration, the shutters may be movable (e.g., the angular position of the shutters relative to the frame 13 may be movable) such that the shutters are operable as control surfaces as discussed above, for example, the angle of each shutter may be movable so as to provide attitude control for the interconnectable tile 10. Moreover, within the open configuration, the shutters may be configurable between a plurality of positions to vary the amount of fluid flow therethrough. For example, as shown in FIGS. 2F-2G, which schematically illustrate the amount of fluid flow enabled through the shutters, the shutters may be movable within the open configuration to enable more (FIG. 2F) or less (FIG. 2G) fluid to pass therethrough. As reflected in FIG. 2H, the shutters may alternatively be moved to a closed configuration in which no fluid is permitted to pass therethrough. Moreover, the shutters may be secured on a rotatable attachment surface at an open upper end or an open lower end of the interconnectable tile 10, thereby enabling the shutters to rotate about a central axis of the open upper end and/or open lower end of the interconnectable tile 10.

The shutters may be configured to operate with one or more seal members (e.g., seal members embodied as portions of the individual shutters and/or seal members located at a perimeter of the open upper end and/or open lower end, so as to seal an interior of the interconnectable tile 10 when the shutters are in a closed configuration. In such embodiments, the interconnectable tile 10 may comprise one or more fluid pumps (e.g., air pumps, water pumps, and/or the like) configured to evacuate fluid from an interior of the sealed interconnectable tile 10 (e.g., to replace water with air, to replace air with water and/or the like) so as to enable the interconnectable tile 10 to be utilized as ballast and/or a buoyant float for an interconnected surface 100 encompassing the interconnectable tile 10. However, it should be understood that the shutters need not be a in a fluid tight configuration when closed in certain embodiments. For example, the shutters may be configured to adjust the fluid flow characteristics over an exterior surface of the interconnectable tiles 10, while enabling a small amount of fluid to pass between shutters into/out of an interior of the interconnectable tiles 10.

Moreover, the thrust unit of an interconnectable tile 10 may be embodied as a single thrust-providing mechanism, such as a single propeller operated via a single motor. However, it should be understood that the thrust unit of certain embodiments comprises a plurality of thrust-providing mechanisms, such as a plurality (e.g., two, three, four, five, six, and/or the like) of motor and propeller combinations, mounted within the frame 11 of the interconnectable tile 10. Moreover, in certain embodiments the thrust unit may be reversible (e.g., to provide thrust in one of opposing directions). In the illustrated embodiment, the motor may be configured to rotate the propeller in one of two opposite directions (e.g., clockwise or counter-clockwise), so as to provide thrust in either direction. Such thrust unit capability may enable additional movements of an interconnectable tile 10 and/or interconnected surface 100.

Moreover, the interconnectable tile 10 of the illustrated embodiments of FIG. 1 further comprises an onboard power unit 16, such as a battery (e.g., a rechargeable battery, such as a lithium-ion battery; a plurality of non-rechargeable primary batteries; and/or the like) configured to provide electric power to the controller 18, the thrust unit (e.g., a motor of the thrust unit), one or more communication modules, and/or the like. The power unit 16 may be secured relative to the frame 11 of the interconnectable tile 10. Although not illustrated, in certain embodiments the power unit 16 may be in electrical communication with one or more terminals of the one or more connectors 13, such that the power unit 16 may provide electrical power or control and sensing information to one or more connected interconnectable tiles 10, and/or such that the power unit 16 may receive electrical power from one or more interconnectable tiles 10. Moreover, in certain embodiments (e.g., interconnectable tiles 10 operable within a near-zero/zero gravity environment), the power unit 16 may be in communication with a solar panel or other photovoltaic cell configured to receive and/or convert solar energy into electrical energy for storage within the power unit 16.

Moreover, although discussed herein with reference to an electrical power unit 16, it should be understood that other power units 16, such as a fuel storage unit may be provided in certain embodiments.

In various embodiments, the interconnectable tile 10 additionally comprises one or more sensors, such as position sensors (e.g., accelerometer, gyroscopes, magnetometer, depth-sensors, global positioning systems (GPS), proximity sensors, contact sensors, pressure sensors, and/or the like) for detecting a current position of the interconnectable tile 10, sensors and support circuitry for determining velocity of the interconnectable tile 10, sensors for detecting acceleration of the interconnectable tile 10, environmental sensors (e.g., thermal sensors, SONAR sensors, proximity sensors, contact sensors, pressure sensors, and/or the like), miniaturized sonar and radar, visible and infrared imager and cameras, and/or the like. These sensors may be embodied within a controller housing (described herein), secured relative to a frame 11 of the interconnectable tile 10, and/or the like.

Additional sensors may additionally be provided in certain embodiments, such as cameras, microphones, radars, and/or the like, to collect additional information and/or further facilitate guidance of the interconnectable tile 10.

As noted herein, the interconnectable tile 10 may additionally comprise a controller 18 configured for generating guide signals for the interconnectable tile 10 to control operation of the onboard thrust unit and/or one or more additional interconnectable tiles 10 that may be present. Moreover, the controller 18 may be configured to process signals generated by the one or more onboard sensors discussed above (and/or to utilize signals generated by the one or more onboard sensors when generating guide signals for the thrust unit), to process control commands received from external devices, such as other interconnectable tiles 10, control devices, and/or the like.

The controller 18 may comprise an onboard computing entity, comprising one or more processors and one or more memory storage devices. In certain embodiments, the one or more memory storage devices may store data indicative of one or more control models, wherein each control model may correspond to a particular level of connectivity of the interconnectable tile 10 relative to other interconnectable tiles 10. For example, a first control model may be utilized for controlling operation of an interconnectable tile 10 while the interconnectable tile 10 is operating independently, unconnected to any other interconnectable tiles 10. A second control model may be utilized for controlling operation of the interconnectable tile 10 while the interconnectable tile 10 is attached to one other interconnectable tile 10 (thereby implementing a distributed control model with the other interconnectable tile 10 for the interconnected surface 100 embodied by the two connected interconnectable tiles 10). A third control model may be utilized for controlling operation of the interconnectable tile 10 while the interconnectable tile 10 is attached to two other interconnectable tiles 10 in a first configuration (e.g., the three interconnectable tiles 10 being connected in a straight line). It should be understood that additional control models may be stored in an onboard memory storage device of a controller 18 of an interconnectable tile 10.

As mentioned above, the controller 18 of a single interconnectable tile 10 may be configured to implement a portion of a distributed control model for an interconnected surface 100, collectively with controllers 18 of other interconnectable tiles 10 within the interconnected surface 100. Thus, the controller 18 may be configured to communicate with controllers 18 of other interconnectable tiles 10 to determine appropriate movements to implement desired collective movements and/or manipulations of an interconnected surface 100. In various embodiments, the controller 18 may be configured for independent determinations of appropriate movements of a corresponding interconnectable tile 10 to accomplish a portion of an overall collective movement of an interconnected surface 100. In other embodiments, the controller 18 may be configured to implement control commands generated by another controller 18 (or other control station) without independent consideration of appropriate control signals for the interconnectable tile 10. In yet other embodiments, a controller 18 may be configured to implement a hybrid control system, in which control commands are received by the controller 18 for a particular interconnectable tile 10, and the controller 18 is configured to adjust and/or modify the received control commands as necessary to carry out an overall collective movement of an interconnected surface 100 (or other grouping of a plurality of interconnectable tiles 10).

In certain embodiments, the controller 18 may be positioned within a controller housing (not shown) secured relative to a frame 11 of the interconnectable tile 10. The controller housing may be configured to protect the electronic components of the controller 18. Moreover, although not shown, the controller 18 may additionally comprise a display and/or a user input element configured to provide information to a user and/or to receive user input from a user (e.g., to turn on/off the interconnectable tile 10). The display and/or user input element may be accessible from outside of the controller housing in certain embodiments.

In various embodiments, the controller 18 and/or power unit 16 of an interconnectable tile 10 may be in communication with a power receiver, such as a photovoltaic element configured for generating electrical power via received solar energy. Such embodiments may be particularly relevant for interconnectable tiles 10 operable in near-zero/zero gravity environments, such as space-travel interconnectable tiles. However, it should be understood that submerging interconnectable tiles 10 of certain embodiments may comprise photovoltaic elements configured to receive solar energy when floating on a surface of a body of water.

In certain embodiments, the controller 18 is in communication with a communication module 19 configured for transmitting and/or receiving data from one or more external sources. In certain embodiments, the communication module 19 is embodied as one or more antennae (e.g., an audio antenna, a radio frequency transceiver, a microwave transceiver, and/or the like) configured for wireless data receipt and/or transmission with one or more external sources. The communication module 19 may be configured for communicating via any of a variety of wireless communication technologies, such as a Wireless Area Network (WAN) (e.g., Wi-Fi), a Personal Area Network (PAN), Bluetooth, Bluetooth Low Energy (BLE), cellular data transmission protocols, audio-based data transmission, light-based data transmission, and/or the like. In certain embodiments, the controller 18 may communicate through custom or specialized communication protocols provided specifically for communication with interconnectable tiles 10 as discussed herein. In other examples, the communication module may be configured for communicating via one or more line-of-sight based communication protocols, such as infrared (IR) communication protocols. In various embodiments, the communication module 19 is configured for communicating with the communication modules 19 of other connected interconnectable tiles 10, for example, via data connections integrated within connectors 13 of certain embodiments.

In certain embodiments, an interconnectable tile 10 may have one or more auxiliary features that may provide additional functionality to the interconnectable tile 10 or an interconnected surface 100 incorporating the interconnectable tile 10. It should be understood that various interconnectable tiles 10 may comprise different (or none) of the example auxiliary features. For example, certain interconnectable tiles 10 may additionally comprise one or more articulating arms (or other manipulation features, such as hooks, resilient pads, and/or the like) for manipulating objects, a basket or other object support mechanism for supporting and/or carrying at least a portion of an object, or a beacon for providing data and/or signals external to the interconnectable tile 10 (e.g., a light-based beacon, a sound-based beacon, an infrared-based beacon, and/or the like), a laser beam for illumination and communication. As other examples, an interconnectable tile 10 may comprise a repeater for extending the range of one or more signals (e.g., to operate as a temporary cellular network node), a reflector to reflect one or more signals, an auxiliary power unit for providing power to other interconnectable tiles 10, and/or the like.

Again, it should be understood that different interconnectable tiles 10 need not be identical. Certain interconnectable tiles 10 may have a similar overall shape to facilitate interconnection therebetween. Other interconnectable tiles 10 may have a different overall shape to serve a different overall function. For example, certain interconnectable tiles 10 may not be configured for interconnection with other interconnectable tiles 10, but may instead serve as master controllers for a plurality of other interconnectable tiles 10 (the onboard controllers 18 of those other interconnectable tiles 10 operating as slave controllers executing control commands transmitted from the master controller onboard a interconnectable tile 10). It should be understood that any of a variety of configurations may be utilized in certain embodiments.

Each interconnectable tile 10 may also comprise one or several sensor(s) of the same of varying kinds to facilitate the dynamic attachment and detachment process as discussed herein.

Interconnected Surface

Figure 5:
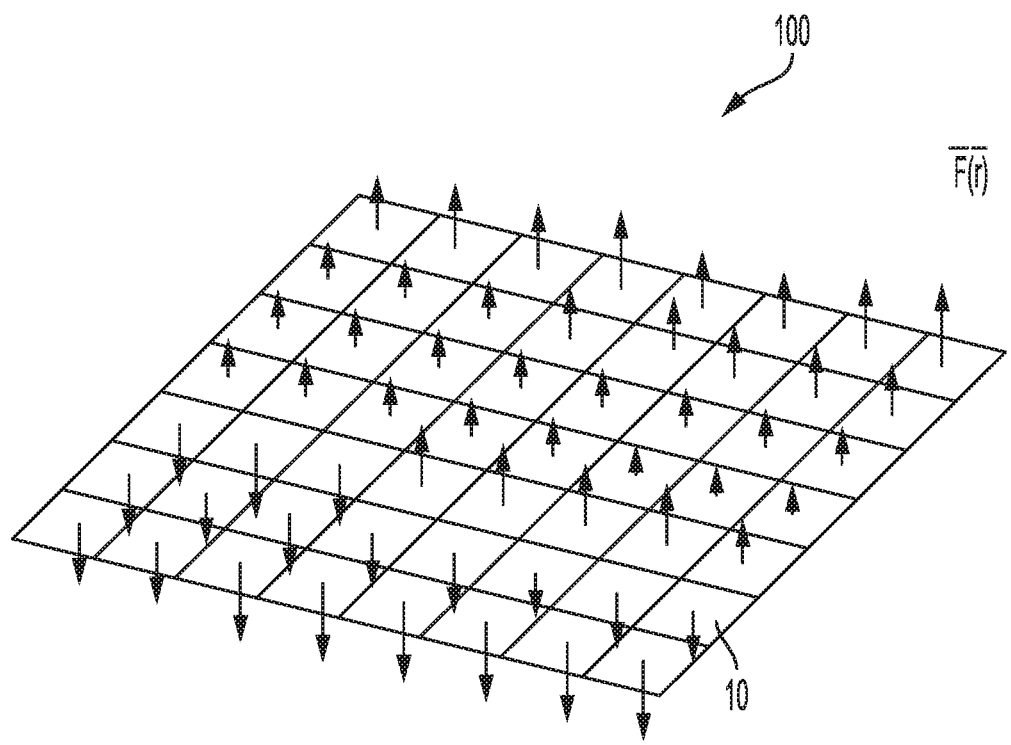
FIGS. 5-6 illustrate thrust vectors possible with rigid and flexible floating surfaces, respectively, according to various embodiments.

In certain embodiments, an interconnected surface 100 may comprise an array of a plurality of interconnectable tiles 10 collectively defining opposing faces of the interconnected surface 100. Each face may be defined by ends of adjacent interconnectable tiles 10. As is evidence from the discussion herein, each face may be at least partially open (e.g., through open ends of included interconnectable tiles 10), however at least a portion of a face may be closed (e.g., via shutters in a closed configuration of one or more interconnectable tiles 10). The interconnectable tiles 10 within an interconnected surface 100 may be secured relative to one another via joints located on sides of each interconnectable tile 10, such that the interconnectable tiles 10 collectively form a single-layer surface (e.g., a planar or non-planar surface having a plurality of bends, curves, corners, and/or the like). The interconnectable tiles 10 of certain embodiments are configured to individually and independently receive power and/or control information and to provide controllable thrust. An interconnected surface 100 may be rigid (e.g., characterized by rigid joints between interconnectable tiles 10), flexible (e.g., characterized by flexible joints between interconnectable tiles 10), a combination of flexible and rigid joints (e.g., characterized by rigid joints between a plurality of interconnectable tiles 10 and flexible joints between another plurality of interconnectable tiles 10), or joints having an adjustable rigidity (e.g., characterized by joints that are controllable between a rigid configuration and a flexible configuration, or varying degrees of flexibility). In the case of an at least substantially rigid interconnected surface 100, the interconnected surface 100 may be planar or another shape (e.g., having a shape of a marine vehicle hull, tubular, and/or the like). Moreover, in the case of a rigid interconnected surface 100, the distributed thrust units (the thrust units of individual interconnectable tiles embodied within the interconnected surface 100) may be adjusted independently, enabling the performance of a broad range of dynamic maneuvers, movements, and attitude control actions in a very seamless and effective fashion. Moreover, as discussed herein, individual interconnectable tiles 10 may comprise shutters that may be selectably moved between open and closed configurations to adjust the fluid dynamics of the interconnected surface 100. For example, a subset of interconnectable tiles 10 within an interconnected surface 100 may be sufficient to provide thrust for the entirety of the interconnected surface 100, and the remaining interconnectable tiles 10 may configure included shutters to a closed configuration to decrease drag as the interconnected surface 100 moves through a fluid (e.g., water). Furthermore, interconnected surfaces 100 utilizing a large number of small and independently controllable thrust units are robust in the case of failure of one or more interconnectable tiles 10, as the non-failing interconnectable tiles within the same interconnected surface 100 are capable of supporting the failing interconnectable tiles 10 during operation. FIG. 5 schematically illustrates an interconnected surface 100 comprising a plurality of individual interconnectable units 10 secured via rigid joints therebetween.

As discussed herein, the interconnectable tiles 10 embodying an interconnected surface 100 of certain embodiments may be independently and individually powered and controlled, and the interconnectable tiles 10 may be mechanically attached relative to one another. In other embodiments, the interconnectable tiles 10 may share one or more power sources and/or controllers (e.g., via one or more centralized power sources and/or controllers, or via power sources and controllers located on each interconnectable tile 10 that are configured for sharing power and/or processing resources therebetween).

Figure 4A:
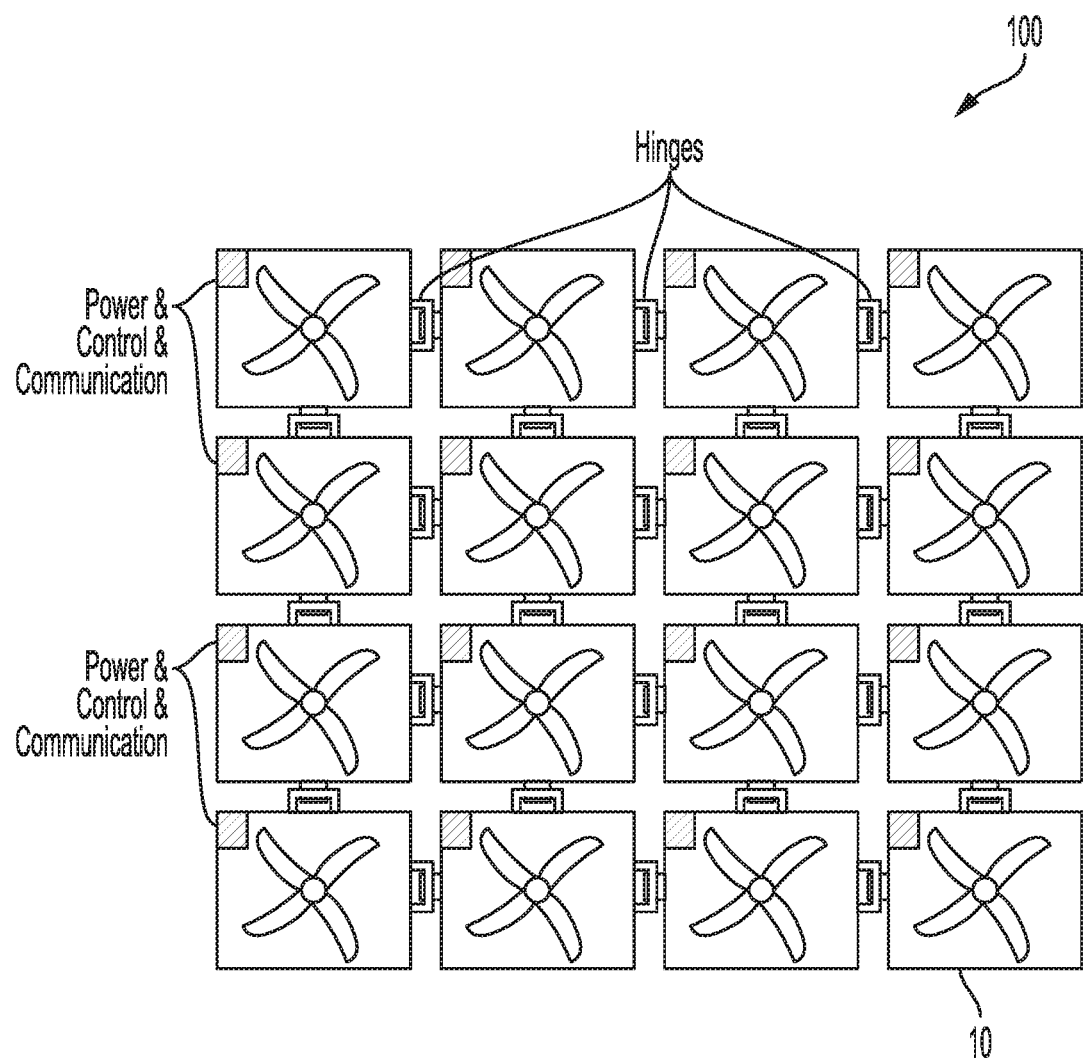
FIGS. 4A-4F are alternative schematic representations of various arrangements of interconnectable tiles having flexible joints therebetween to form flexible floating surfaces according to certain embodiments.
Figure 4B:
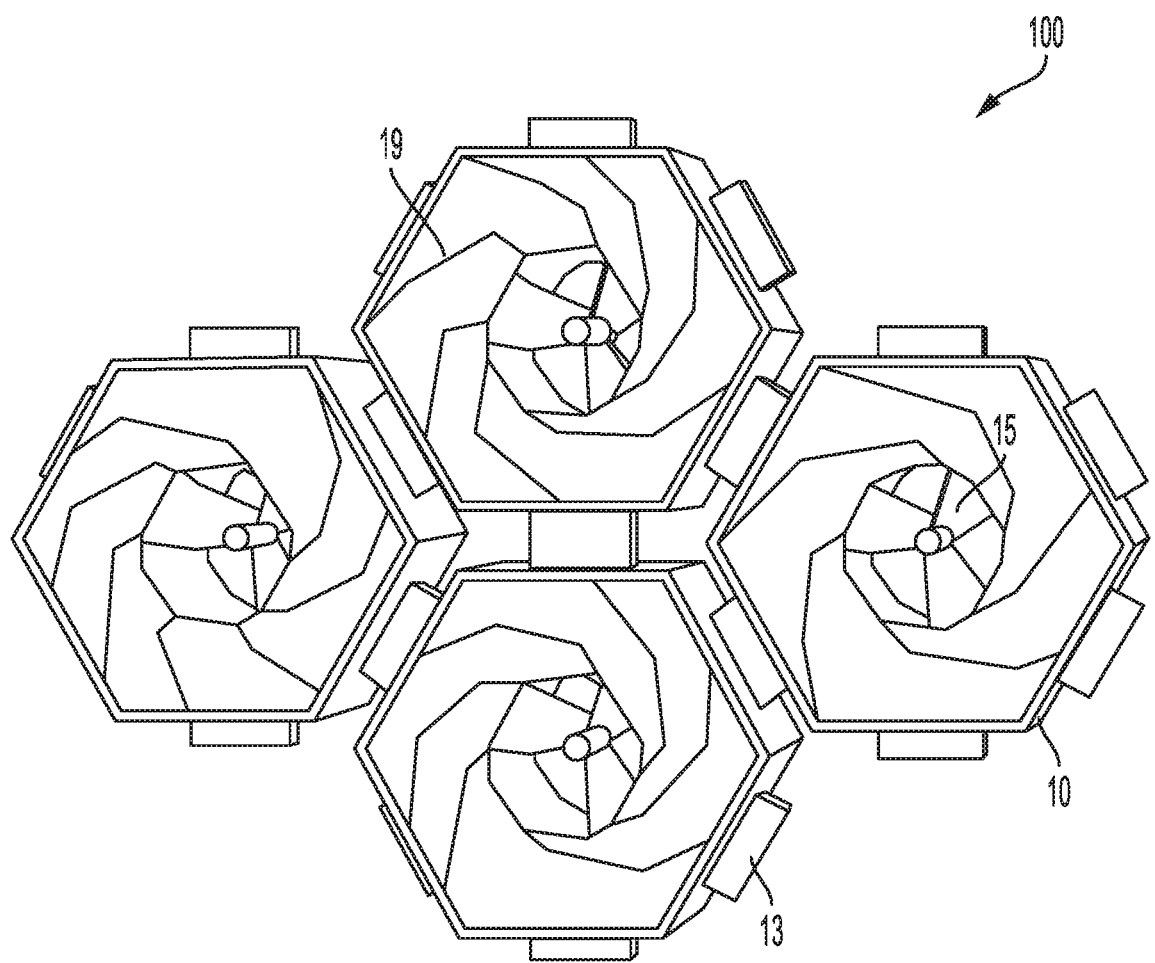
Figure 6:
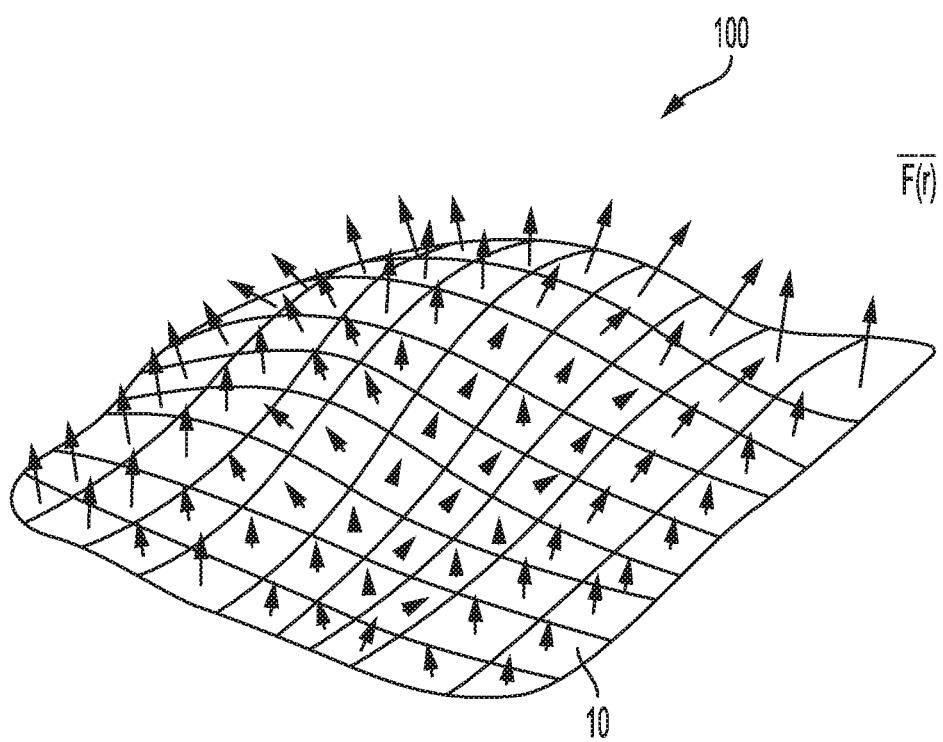

As discussed herein, the mechanical connection between interconnectable tiles 10 of an interconnected surface 100 may be rigid in certain embodiments (e.g., as illustrated in FIGS. 2 and 5) or flexible (e.g., via flexible joints or flexible composite materials) (e.g., as illustrated in FIGS. 4A-4B and 6) to enable adjustable conformity and/or dynamically changing of its shape. In certain embodiments, the rigidity of joints between interconnectable tiles 10 may be dynamically adjusted (e.g., during operation) to perform various operational maneuvers. As an example, one or more joints may be embodied as flexible joints during a first period of time so as to enable the interconnected surface 100 to self-manipulate in a desired shape (e.g., a low-drag shape for linear travel), and the joints may then reconfigure to adjust their rigidity so as to form rigid joints, so that the shape of the interconnected surface 100 may be locked during a second period of time. Subsequently, the joints may reconfigure into flexible joints, as desired, for manipulating the overall shape of the interconnected surface 100.

Such active fluid dynamics of an interconnected surface 100 are configured for performing a broad range of functions that would not be otherwise possible by other more rigid and fixed systems. FIG. 6 illustrates a conceptual distribution thrust vector diagram (with the illustrated arrows extending normal to corresponding interconnectable tiles 10 of the illustrated embodiment representing thrust forces generated by individual interconnectable tiles 10) for a flexible interconnected surface 100.

Figure 7:
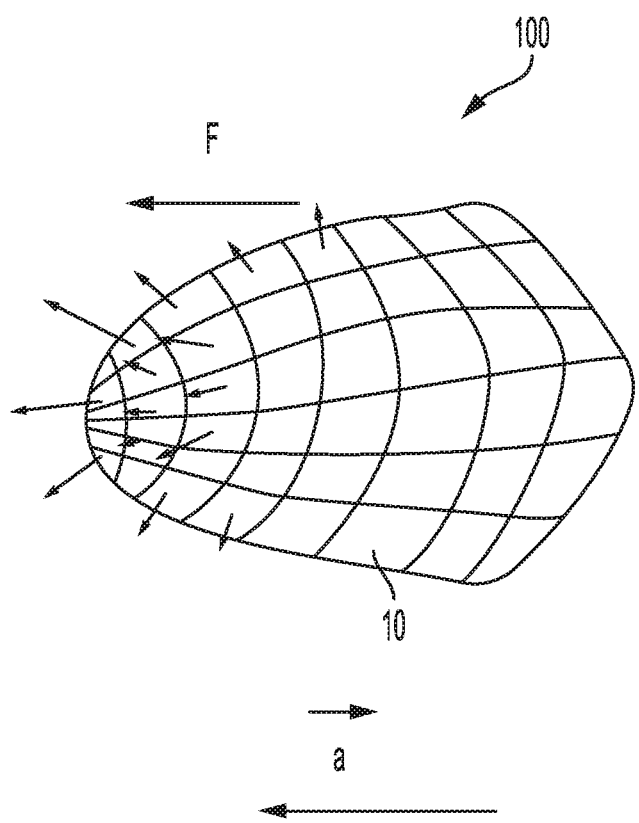
FIGS. 7-8 illustrate example configurations of a flexible floating surface according to various embodiments.
Figure 8:
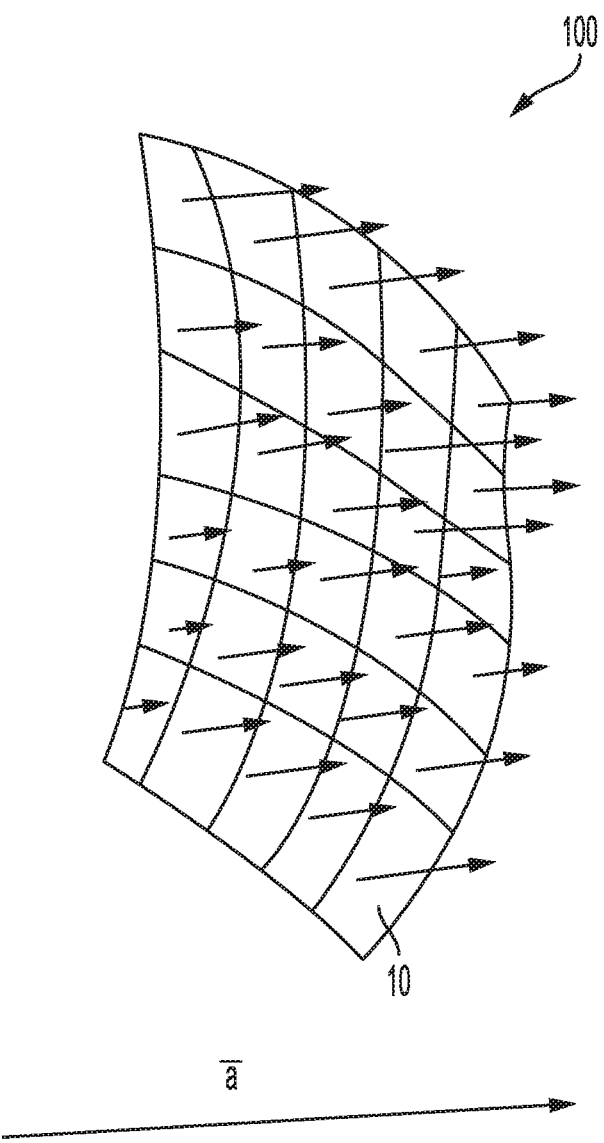

A flexible interconnected surface 100 (characterized by flexible joints between interconnectable tiles 10) enables adjustable modes of operation. For example, interconnected surfaces 100 according to certain embodiments are configured to self-manipulate the shape of the interconnected surface 100 via the distributed thrust vectors enabled by the individual interconnectable tiles 10. For example, the interconnected surface 100 may change between (a) a conical cruising mode as illustrated in FIG. 7 having an low-drag conical shape (e.g., to minimize fluid drag by exposing a minimal surface area of the interconnected surface 100 to a direction of travel) to facilitate efficient movement of the interconnected surface 100 (in the direction of the illustrated acceleration vector) and (b) an at least substantially planar or concave shape (e.g., to maximize fluid drag during deceleration by exposing a maximum surface area of the interconnected surface 100 to a direction of travel) referred to as a braking mode as shown in FIG. 8 (wherein the interconnected surface 100 is traveling in a direction opposite the illustrated acceleration vector, and the interconnectable tiles 10 are applying thrust in a direction opposite the movement of the interconnected surface 100 so as to decelerate the interconnected surface 100).

In other embodiments, the interconnected surface 100 may be configured to perform other maneuvers, such as maneuvering individual ones of the included interconnectable tiles 10 so as to perform object manipulation, object grabbing, object holding, object moving, and/or the like. For certain maneuvers, thrust units of individual interconnectable tiles may be reversed, so as to provide reverse thrust for the interconnectable tile 10 (e.g., to provide upward thrust while the interconnectable tile 10 is oriented upside down), to move the interconnectable tile 10 to a desired position/orientation quickly, to generate a suction pressure against a held object (as discussed herein), and/or the like.

For example, in one example embodiment, interconnected surfaces 100 are constructed using an array of interconnectable tiles 10 each comprising a motor 14, a propeller 15, a power unit 16, and a controller 18 (e.g., wireless control unit). These interconnectable tiles 10 may be arranged in any of a variety of configurations to form a single-layer interconnected surface 100, such as those shown in FIGS. 3A-3B and 10A-10H.

In certain embodiments, one or more of the interconnectable tiles 10 may comprise additional functional units, such as cameras, sensors, long-range communication modules, advanced control modules, additional power supply units, object manipulation devices (e.g., actuatable arms, actuatable claws, object hooks, and/or the like), and/or the like. Accordingly, the system enables a highly modular reconfigurable craft (interconnected surface 100) capable of fast reconfiguration for different functions and operations by replacing or reconfiguring certain individual interconnectable tiles 10 with others having desired functional units.

Although the illustrated embodiments of FIGS. 2-8 and 10A-10H illustrate interconnected surfaces 100 as being at least substantially gapless, characterized by minimal distance between adjacent interconnectable tiles 10 (and a maximum fill-factor) based at least in part on the size of joints between adjacent interconnectable tiles 10, it should be understood that in certain embodiments, an interconnected surface 100 may have one or more gaps defined therein. As just one example, one or more gaps may have a size and shape at least substantially similar to the size and shape of an interconnectable tile 10. The one or more gaps may be surrounded on one or more (e.g., all) sides by additional interconnectable tiles 10. As yet other examples, a gap may be defined between interconnectable tiles 10 and may have a size and shape corresponding to natural gaps between adjacent interconnectable tiles 10 (e.g., due to geometrical limitations preventing adjacent, irregularly-shaped interconnectable tiles 10 from forming a gapless configuration).

Moreover, although the illustrated embodiments are specifically directed to single-layer interconnected surfaces 100, it should be understood that in certain embodiments, interconnectable tiles 10 may be configured to connect relative to one another (e.g., via corresponding connectors) to form multiple layers. In such embodiments, a plurality of single-layer interconnected surfaces 100 may be secured relative to one another (e.g., at least substantially parallel) so as to provide multi-layer interconnectable shrouds, multi-layer interconnectable planks, and/or the like, as may be desired. Moreover, as discussed herein, the interconnectable tiles 10 of a first layer may provide, operate as, or otherwise comprise one or more control surfaces for thrust generated by interconnectable tiles 10 within a second layer. The interconnectable tiles 10 within a first layer may be configured to generate thrust through operation of their included thrust units, or at least a portion of the interconnectable tiles 10 within the first layer may be deactivated, thereby providing passive control surfaces for manipulating air flow generated by the thrust units of interconnectable tiles 10 within the second layer.

Distributed Control

Control of an interconnected surface 100 comprising a plurality of individual interconnectable tiles 10 may be achieved globally (e.g., utilizing a centralized control model) or locally (e.g., utilizing an onboard controller 18). In one embodiment, each interconnectable tile 10 (via an onboard controller 18) receives control commands from an external source, such as a centralized command unit 91 or from a remote controlling system. Moreover, in certain embodiments, the controller 18 (and the individual interconnectable tiles 10) may be configured to transmit status data regarding the current status of the unit (e.g., interconnectable tile 10 and/or external source).

In certain embodiments, the status data generated by the controller 18 of a particular interconnectable tile 10 comprises data identifying the interconnectable tile 10. For example, identifying data may comprise a unique identifier comprising character string such as a unique alphanumeric string, a symbol, and/or the like. The unique identifier may be stagnant, and may be assigned permanently to a particular interconnectable tile 10. In such embodiments, the unique identifier may be painted, printed, molded, or otherwise disposed to be human readable on a face (e.g., a face of a frame 11) of the interconnectable tile. However, it should be understood that at least a portion of a unique identifier may be dynamically assigned, for example, based at least in part on a position of an interconnectable tile 10 within an interconnected surface. Accordingly, when providing status data to other interconnectable tiles 10, the identifying data contained within the status data may be indicative of the relative positioning of the interconnectable tile 10 within an interconnected surface.

The status data generated by controllers 18 of individual interconnectable tiles 10 additionally comprises data indicative of the operating conditions of the interconnectable tile 10, such as the amount of power (or fuel) remaining within a power unit, whether the thrust unit is operating properly or operating under an error condition, whether the interconnectable tile 10 is interconnected with joints to other interconnectable tiles 10 and the type of joints utilized for each interconnection, if applicable, which connectors (e.g., identified by connector identifiers corresponding to known positions of the connectors on the interconnectable tile 10) are engaged within joints to other interconnectable tiles 10 and what joint type (e.g., rigid, flexible, dynamic, and/or the like) corresponds to each connector, and/or the like. In certain embodiments, the status data may additionally comprise data indicative of one or more sensor outputs from sensors onboard the interconnectable tile 10, including, for example, altitude data, GPS-positioning data, proximity sensor data, SONAR sensor data, temperature sensor data, velocity data, acceleration data, rate of rotation (for example, obtained from a MEMS gyroscope) and/or the like.

In certain embodiments, the status data may comprise data indicative of a connectivity state of a particular interconnectable tile 10. The connectivity state of an interconnectable tile 10 identifies whether the interconnectable tile 10 is connected with other interconnectable tiles 10, which connectors are incorporated into joints with interconnected other interconnectable tiles 10 (e.g., identified by joint identifiers), a quantity of other interconnectable tiles 10 connected with the particular interconnectable tile 10. In certain embodiments, the status data for a particular interconnectable tile 10 within an interconnected surface may additionally comprise data indicating the total quantity of interconnectable tiles 10 included within the interconnected surface.

As discussed herein, each interconnectable tile 10 encompasses a corresponding controller 18 for generating control signals for the corresponding interconnectable tile 10 alone. The controller of an interconnectable tile 10 may be configured to receive data from an external control system indicating an overall movement pattern of the corresponding interconnected surface 100, without individual control signals specific to a particular interconnectable tile 10. In such embodiments, the controller 18 of each interconnectable tile 10 may be configured to self-determine its own location within an interconnected surface 100, so as to enable a determination of necessary movements of the interconnectable tile 10 to satisfy the overall movement pattern of the corresponding interconnected surface 100. In certain embodiments, a controller 18 of an interconnectable tile 10 may self-determine its own location within an interconnected surface 100 via any of a variety of methodologies. As just one example, each controller 18 may be configured for wired or wireless communication with other interconnectable tiles 10, so as to determine whether and/or how many other interconnectable tiles 10 are attached directly to a particular interconnectable tile 10. The controllers 18 of each interconnectable tile 10 may communicate therebetween and may share data indicative of the number and/or location of interconnectable tiles 10 attached directly thereto. Based at least in part on determinations made by each interconnectable tile 10 of the number and/or locations of interconnectable tiles 10 attached thereto, each controller 18 may determine its own location within an interconnected surface 100. As another non-limiting example, each controller may be configured to receive input identifying its location within an interconnected surface 100. In other embodiments, the controller 18 may be configured to utilize the status data stored locally thereon, and/or the status data of other interconnectable tiles 10 to self-determine its position within the interconnected surface 100.

It should be understood that the physics of movement of a interconnectable tile 10 varies depending on its location within an interconnected surface 100, and therefore the behavior of the interconnected surface 100 varies based on the size and shape of the interconnected surface 100 (based on the quantity and location of interconnectable tiles 10 within the interconnected surface 100) and the type of joints (e.g., flexible, rigid, and/or the like) between interconnectable tiles 10 of the interconnected surface 100. Accordingly, upon a controller of a particular interconnectable tile 10 determining its own location within an interconnected surface 100, the controller may be configured to identify a relevant control model so as to enable appropriate movements by the interconnectable tile 10 to satisfy an overall movement pattern of the corresponding interconnected surface 100. As an illustrating example, providing thrust normal to an interconnectable tile 10 located centrally within a large interconnected surface 100 (such that the interconnectable tile 10 is surrounded by multiple rows of additional interconnectable tiles 10 on all sides) will likely result in the interconnectable tile 10 moving in the direction of the provided thrust, however the movement of the interconnectable tile 10 will be affected by thrust provided by interconnectable tiles 10 surrounding the interconnectable tile 10 in question. By contrast, an interconnectable tile 10 attached on only one side to a series of other interconnectable tiles 10 by a flexible joint will be characterized by other control behavior by a thrust generated normal to the interconnectable tile 10. Rather than moving in a linear direction at least substantially parallel to the generated thrust, the thrust generated creates a moment about the joint, causing the interconnectable tile 10 to move in an angular direction about the joint (assuming the connected interconnectable tiles 10 do not have parallel and equal thrust outputs).

Accordingly, to implement an overall movement pattern of an interconnected surface 100, each interconnectable tile 10 may be configured to compare its current location, orientation, angle, and/or the like (e.g., determined via one or more onboard sensors) relative to a target position of the interconnectable tile 10, as determined by the overall movement pattern. Upon determining that one or more positional adjustments are necessary to achieve the overall movement pattern, the controller 18 provides control signals to the onboard thrust unit based on a control model implemented in accordance with determined physics of movement of the interconnectable tile 10 within the interconnected surface 100 to move the interconnectable tile 10 toward a desired position. The controller 18 may utilize a control loop to detect as the interconnectable tile 10 is moving toward the desired position to make necessary adjustments to the control signals provided to the onboard thrust unit to achieve the desired positioning of the interconnectable tile 10. The control loop (e.g., detecting the current positioning of an interconnectable tile 10 and comparing the detected position relative to a desired position) enables individual interconnectable tiles 10 to accommodate disabled interconnectable tiles 10 within the interconnected surface 100 by adjusting the amount of thrust generated by a thrust unit of an individual interconnectable tile and/or variations in control surface (if present) 10 upon a determination that additional thrust is required to move the interconnectable tile 10 to a desired position (e.g., as a result of a disabled interconnectable tile 10 within the interconnected surface 100 failing to aid in movement of the interconnected surface 100).

As discussed herein, an overall movement pattern of an interconnected surface 100 may encompass any of a plurality of movements and may be dependent at least in part on whether included joints between interconnectable tiles 10 are rigid or flexible. As discussed in the below example use cases, an overall movement pattern may enable an interconnected surface 100 to grasp and/or manipulate objects (e.g., between interconnectable tiles 10), to self-configure the shape of the interconnected surface 100 to facilitate movement through a fluid (or a vacuum environment), and/or the like. In each of the described overall movement patterns, individual interconnectable tiles 10 are configured to self-determine appropriate movements for the individual interconnectable tiles 10 so as to implement the overall movement pattern of the interconnected surface 100.

Moreover, the distributed control methodology may be configured to enable one or more controllers 18 of interconnectable tiles 10 within an interconnected surface 100 to depower (e.g., power off, enter a stand-by mode, or otherwise cause the onboard thrust unit to discontinue generating thrust) upon a determination that a depowered operation is necessary to achieve a control pattern of the overall interconnected surface 100.

Additionally, although the controller 18 is described above as embodied as a single controller-device, it should be understood that a controller 18 in accordance with certain embodiments may comprise a plurality interacting controllers 18 (e.g., of one or more interconnectable tiles 10), where the overall behavior of the interconnected surface 100 is controlled through the aggregate overall behavior of the controllers 18 and their interactions.

Centralized Control

In other embodiments, the interconnectable tiles 10 of an interconnected surface 100 may be controlled in accordance with a centralized control configuration, such that controllers of individual interconnectable tiles 10 receive direct control instructions from a centralized controller that may be conveyed directly to an onboard thrust unit. Thus, rather than individual controllers having to make determinations of how the interconnected surface 100 will react to particular control signals provided to the onboard thrust unit, a centralized control system makes determinations of appropriate control signals to be provided to onboard thrust units.

As a specific example, at least a portion of the controllers 18 of interconnectable tiles 10 within an interconnected surface 100 become configured as slave controllers to one or more master controllers. In certain embodiments, a master controller may be embodied as one of the controllers of a particular interconnectable tile 10 within an interconnected surface 100. In other embodiments, the master controller may be embodied as a control unit located external to the interconnected surface 100, such as on a different interconnectable device (e.g., not physically connected to interconnectable tiles 10 within the interconnected surface 100), on a stationary device (e.g., located on the ground), and/or the like. As just one example, a centralized control unit may be embodied as a base station or communication hub specifically configured for operation with one or more interconnectable tiles 10 (e.g., comprising appropriate communication transmitters/receivers so as to transmit and/or receive signals to/from a plurality of interconnectable tiles 10). In certain embodiments, such a base station or communication hub may be configured for transmitting a plurality of signals, for example, to be received by a plurality of interconnectable tiles 10 (e.g., utilizing different transmission frequencies, time-division communication signals, frequency-division communication signals, and/or the like). In certain embodiments, a single communication signal transmitted from a base station or communication hub may be provided for receipt by a plurality of interconnectable tiles 10, and the communication signal may comprise interconnectable tile-specific data segments (e.g., delimited portions of data) applicable for each of a plurality of interconnectable tiles 10. In such embodiments, the controller 18 of each interconnectable tile may be configured to identify applicable portions of the transmission (e.g., based on unique identifiers included within the data transmission) so as to carry out appropriate control commands as indicated within the data transmission.

In such embodiments, the master controller is configured to transmit signals to one or more slave controllers within the interconnected surface 100, specifically instructing those slave controllers how to interact with thrust units onboard the individual interconnectable tiles 10. In certain embodiments, signals transmitted from the master controller may be transmitted together with a unique identifier corresponding to a particular slave controller. The unique identifier may be utilized by each slave controller to determine whether associated signals are applicable to a particular slave controller. In use, a particular slave controller receives signals from the master controller and determines which (if any) received signals are applicable to the slave controller based at least in part on comparing a unique identifier received with the signals against a unique identifier stored locally at the slave controller. Upon identifying one or more signals applicable to the particular slave controller, the slave controller provides control signals to the onboard thrust unit in accordance with the received signals, so as to implement the signals received. Each of a plurality of controllers corresponding to individual interconnectable tiles 10 within the interconnected surface 100 separately implement signals designated by specific unique identifiers, and collectively the interconnectable tiles 10 implement an overall movement pattern of the interconnected surface 100.

Moreover, slave controllers may be configured to transmit status data to the master controller, thereby enabling the master controller to accommodate disabled and/or malfunctioning interconnectable tiles 10. For example, upon a master controller determining that one or more interconnectable tiles 10 are malfunctioning (e.g., based on a failure to receive status data from a interconnectable tile 10 at a designated time), the master controller may be configured to adjust control signals to be provided to other, functional interconnectable tiles 10 to accommodate the determined disabled interconnectable tile 10. In other embodiments, the status data provided by an interconnectable tile 10 may further comprise positional data and/or dynamic operational information (e.g. attitude, speed, thruster instantaneous power, and/or the like), thereby enabling the master controller to implement a control loop similar to that discussed above in reference to the decentralized control. For example, the master controller may be configured to determine, based at least in part on status data received from the individual interconnectable tiles 10, whether an interconnectable tile 10 is in a desired position, and to provide control signals to the interconnectable tile 10 to cause the interconnectable tile 10 to move toward a desired position.

Moreover, the centralized control configuration enables individual interconnectable tiles 10 to be disabled or otherwise depowered in order to accommodate desired positioning of various interconnectable tiles 10 within an interconnected surface 100.

It should be understood that certain embodiments may utilize a hybrid control configuration, encompassing both distributed and centralized control features. For example, overall control behaviors, maneuvers, and/or the like, applicable to an interconnected surface 100, a swarm of interconnectable tiles 10, and/or the like, may be generated at a centralized controller, and command signals may be provided to a plurality of controllers 18 of individual interconnectable tiles 10 in accordance with the centralized control aspects. Those individual interconnectable tiles 10 may be configured to adjust or otherwise modify the command signals upon receipt, for example, to accommodate characteristics of the environment surrounding the interconnectable tile 10, to accommodate current performance of the interconnectable tile 10 (e.g., underpowered thrust unit, differences between theoretical and actual movements based on joints with other interconnectable tiles 10, and/or the like). Other embodiments may utilize a hybrid control configuration so as to accommodate differences in interconnectable tiles 10, to accommodate differences in control configurations of multiple interconnected surfaces 100, and/or the like.

Moreover, it should be understood that control signals may be passed between interconnectable tiles 10 via any of a variety of data communication protocols. For example, data may be passed between interconnectable tiles 10 via a wired communication (e.g., existing between connectors 13 of individual interconnectable tiles). The interconnectable tiles 10 may be configured to review all control data received and/or to rely the received data to a plurality of connected interconnectable tiles 10. Accordingly, a single interconnectable tile 10 may be embodied as a master controller, and signals generated by the master controller may be relayed to all interconnectable tiles 10 within the interconnected surface 100, even though certain interconnectable tiles 10 may not be directly connected to the master controller.

Interconnected Surface Operation

As discussed herein, the control behavior of the interconnected surface 100 may be achieved via global control (e.g., via a centralized controller) or distributed local control (e.g., via control performed at individual interconnectable tiles 10) and may be based at least in part on predicted movement behaviors of the interconnectable tile. As discussed herein, each interconnectable tile 10 receives control commands from a centralized command unit (e.g., which may be embodied as a controller 13 onboard one interconnectable tile 10 within an interconnected surface 100). In certain embodiments, each interconnectable tile 10 transmits pertinent measurement information (e.g., generated by onboard sensors), which may be a part of status data, to a command unit, remote controlling system, and/or the like. In other embodiments, also as discussed herein, each interconnectable tile 10 operates independently to generate its own control signals so as to implement an overall movement pattern of the interconnected surface 100.

In certain embodiments, the interconnected surface 100 is characterized by rigid joints between connected interconnectable tiles 10 included therein. In such embodiments, the interconnected surface 100 operates as a rigid interconnected surface 100 maneuverable as a rigid body.

In other embodiments, the interconnected surface 100 is characterized by flexible joints between some or all of the connected interconnectable tiles 10 included therein. In such embodiments, the interconnected surface 100 operates as a flexible interconnected surface 100 in which individual interconnectable tiles 10 are movable relative to adjacent and connected interconnectable tiles 10, and accordingly the overall interconnected surface 100 is maneuverable through individual movements of specific interconnectable tiles 10 connected in a flexible manner.

In yet other embodiments, the interconnected surface 100 is characterized by dynamically reconfigurable joints having configurable rigidity. In such embodiments, control of the interconnected surface 100 may encompass changing the rigidity of one or more joints (e.g., to selectably lock the interconnected surface 100 in a desired configuration, and to subsequently unlock the interconnected surface 100 so as to change the shape of the interconnected surface 100).

In certain embodiments, interconnectable tiles 10 may have fluid dynamically efficient movement behaviors within an interconnected surface 100, for example, by selectably deactivating one or more thrust units of individual interconnectable tiles 10 within an interconnected surface 100 so as to efficiency move the interconnected surface 100 through an environment (e.g., through a submarine environment, through a zero-gravity environment, and/or the like). In certain embodiments, one or more interconnectable tiles 10 may be configured to move included shutters to a closed configuration so as to decrease the drag across the surface of the interconnected surface 100.

As discussed herein, the controllers 18 of individual interconnectable tiles included within an interconnected surface 100 may be configured to determine a predicted behavior of the overall interconnected surface 100 when generating control signals for controlling onboard thrust units. Depending on the use of a particular interconnected surface (e.g., as discussed herein), the controllers 18 may be configured to generate appropriate control signals to implement a desired operation of the overall interconnected surface 100, considering the predicted behavior of the overall interconnected surface 100. As just one example, upon determining that one interconnectable tile 10 within an interconnected surface 100 comprises a camera, the controllers 18 of the interconnectable tiles 10 may be configured to generate control signals that cause the overall interconnected surface 100 for stable repositioning of the camera, such that the camera remains substantially stable (with minimal oscillation) during movements of the interconnected surface 100.

Dynamic Reconfiguration of an Interconnected Surface

The operation of an interconnected surface 100 may be selectably reduced to a swarm of individual interconnectable tiles 10 (or smaller interconnected surfaces 100 comprising a small plurality of interconnectable tiles 10), reconfigured dynamically during operation, and/or to dispatch certain portions of the interconnected surface 100 (e.g., a subset of the interconnectable tiles 10 of the interconnected surface 100) to perform certain tasks and/or to reattach and reconfigure during operation provides significant advantages over traditional vehicles. As yet other examples, interconnectable tiles 10 of a first interconnected surface 100 may be configured to detach during operation, to travel to a second interconnected surface 100, and attach to the second interconnected surface 100 during operation.

A dynamically reconfigurable, interconnected surface 100 configured to detach and attach during operation (e.g., portions of the interconnected surface 100, such as individual interconnectable tiles 10) and to reconfigure and reorganize provides a broad range of applications. In various embodiments, individual interconnectable tiles 10 of the interconnected surface 100 may be configured to detach and/or reattach in the same or a different configuration during use (e.g., to change the configuration of the interconnected surface 100 while operating in a submarine environment or in a zero-gravity environment). For example, various embodiments are configured to change the overall behavior of the interconnected surface 100 by rearranging connected interconnectable tiles, to operate as a swarm of smaller interconnected surfaces 100 and/or a swarm of interconnectable tiles 10, to capture a failing or faulty interconnectable tile 10, to dispatch a subset of interconnectable tiles 10 to perform a task, and/or the like.

Interconnectable tiles 10 in accordance with various embodiments are configured to mechanically detach and/or attach relative to one another during operation, thereby enabling mid-operation mechanical reconfiguration of the interconnected surface 100 under power of the thrust units of individual interconnectable tiles 10 (controlled by respective controllers 18 of the interconnectable tiles 10) and/or based on signals generated by one or more onboard sensors of individual interconnected surfaces 10 (e.g., proximity sensors, contact sensors, location sensors, and/or the like). In such embodiments, at least a subset of the interconnectable tiles 10 forming the interconnected surface 100 are configured to mechanically separate from the main structure of the interconnected surface 100, to operate independently and/or in a swarm configuration, and/or to be able to reattach and reconfigure relative to one another to form a larger interconnected surface 100 that may operate as a singular vehicle. As discussed herein, individual interconnectable tiles 10 may be configured for distributed control configurations, in which controllers of each of the individual interconnectable tiles 10 operate independently to self-control movements (e.g., based at least in part on data identifying an overall desired movement pattern of the interconnected surface 100 and/or plurality of interconnectable tiles 10). In other embodiments, the individual interconnectable tiles 10 may be configured for a centralized control configuration (or a hybrid control configuration), in which controllers of each of a plurality of interconnectable tiles 10 operate to execute control command received from a centralized controller configuration. In such embodiments, a controller 18 of a first interconnectable tile 10 may operate as a centralized controller, configured to provide control commands to a plurality of other interconnectable tiles 10, whether those other interconnectable tiles 10 are located within a common interconnected surface 100 with the centralized control interconnectable tile 10, within a swarm with the centralized control interconnectable tile 10, and/or the like.

In certain embodiments, individual interconnectable tiles 10 are configured to launch (e.g., into a marine environment, into a zero-gravity environment, and/or the like) as singular units (or as small interconnected surfaces 100 of a small number of interconnectable tiles) and to join relative to one another during operation to form a larger interconnectable tile to operate as a singular vehicle. It should be understood that while the present disclosure focuses on dynamic attachment and detachment of interconnectable tiles 10 during operation, these interconnectable tiles 10 may be attached and/or detached relative to one another when not in operation (e.g., while resting on a support surface).

Interconnectable tiles 10, such as those discussed above, may attach relative to one another to form an interconnected surface 100, such as the example interconnected surface 100 illustrated in FIGS. 2-4F. As illustrated in the figures, the interconnected surface 100 may be embodied as an at least substantially rigid interconnectable plank (e.g., as illustrated in FIGS. 2A-2B) or as a flexible interconnectable shroud (e.g., as illustrated in FIGS. 4A-4F, demonstrating hinged connectors 13 between interconnectable tiles 10 and flexible composite connectors 13, respectively).

Figure 9:
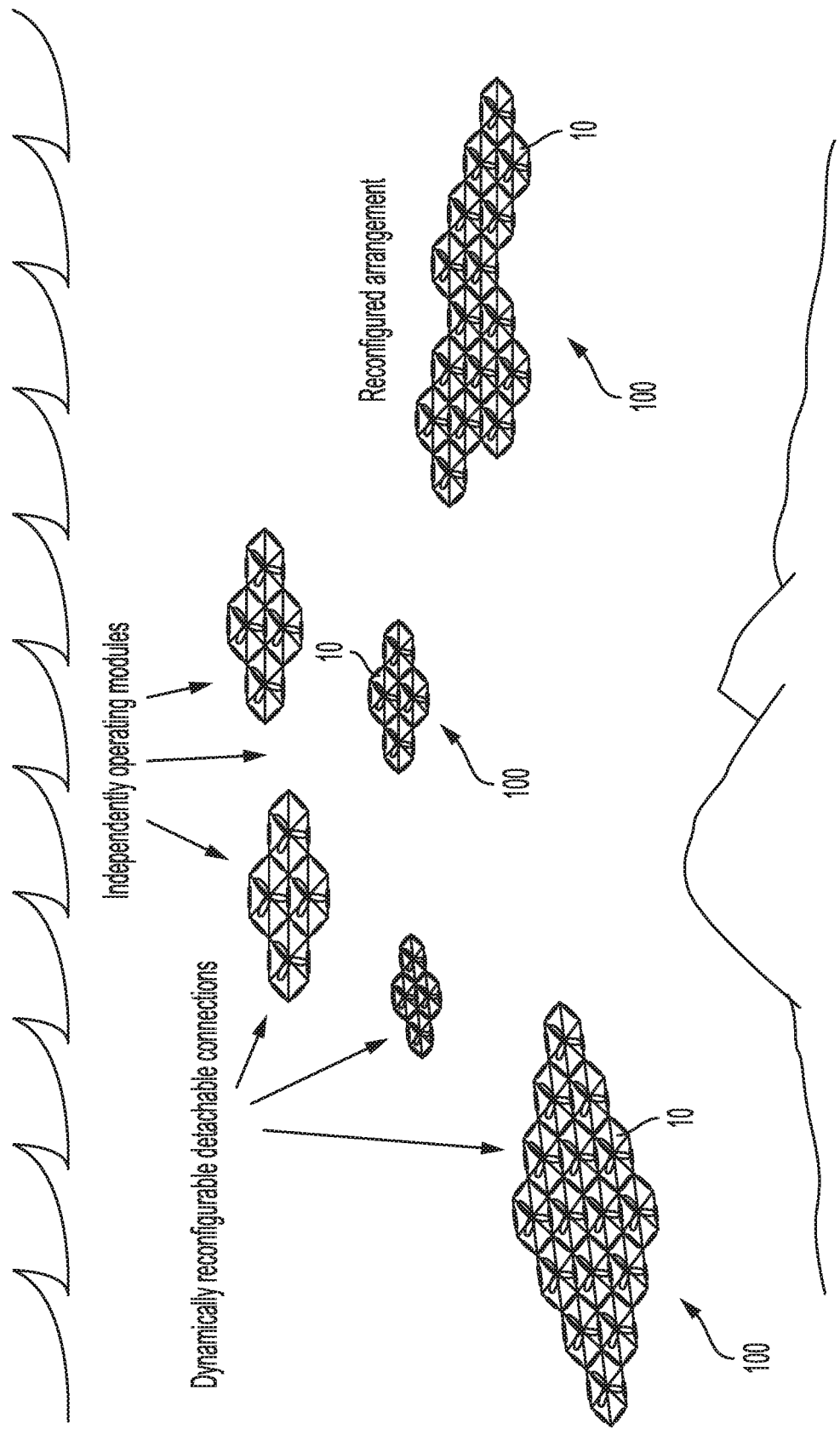
FIG. 9 schematically illustrates submerged reconfiguration of marine-based floating surfaces in accordance with certain embodiments.

As demonstrated at least by the illustrated connectors 13 of FIGS. 4A-4F, the connectors 13 may be configured for dynamic detachment via one of various mechanisms, such as reattaching joints, reconfigurable memory metals, electromagnetics, and/or the like as discussed herein. Such dynamic reconfiguration mechanisms enable a large number of reconfigurations to be possible through detachment and reattachment of different interconnectable tiles 10 during operation (e.g., as shown conceptually in FIG. 9). Such operation is at least in part enabled by the autonomy of each interconnectable tile 10 having its own energy source, communication and control units, navigation, thrust units, and/or the like.

Figure 4C:
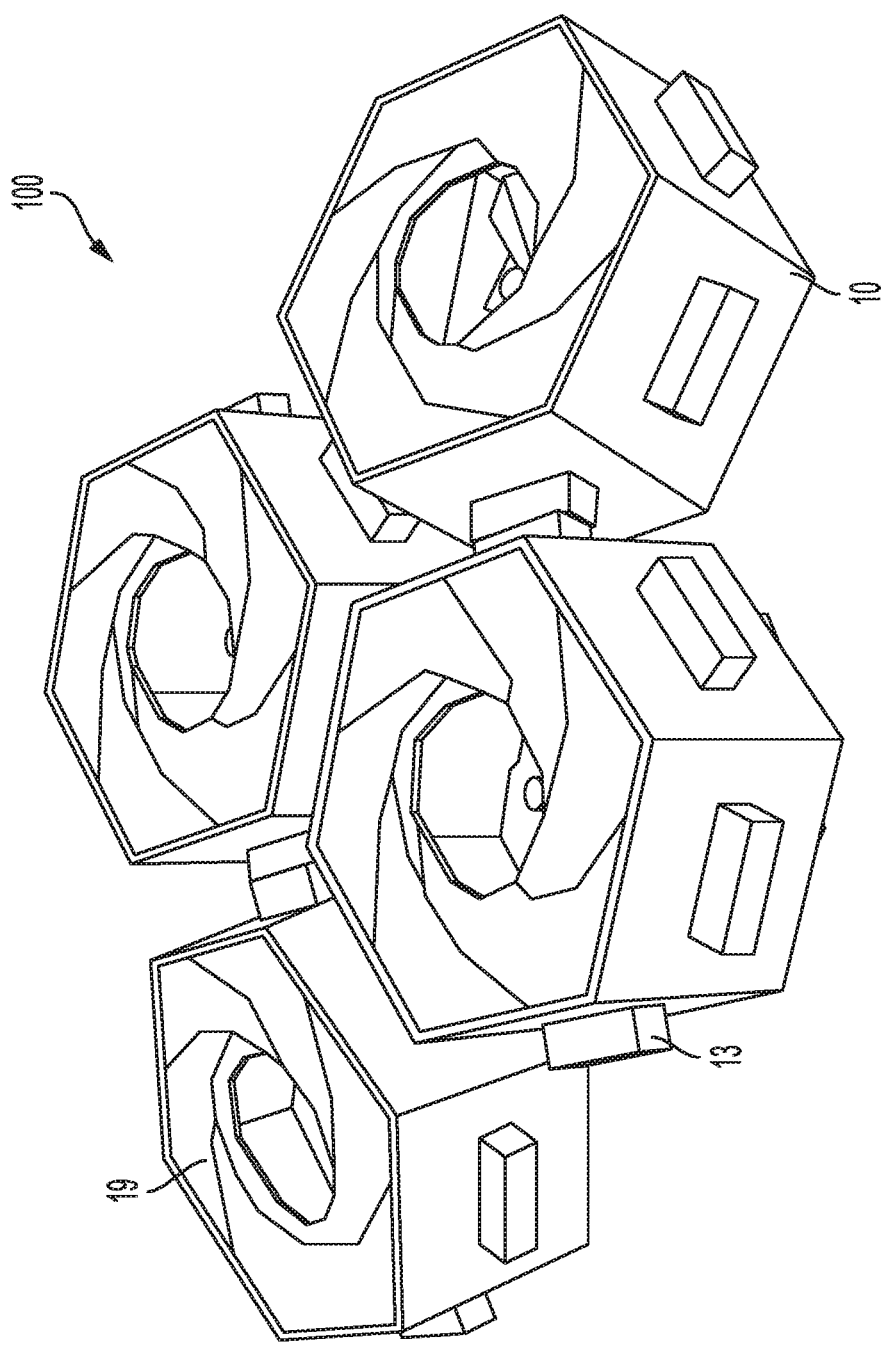
Figure 4D:
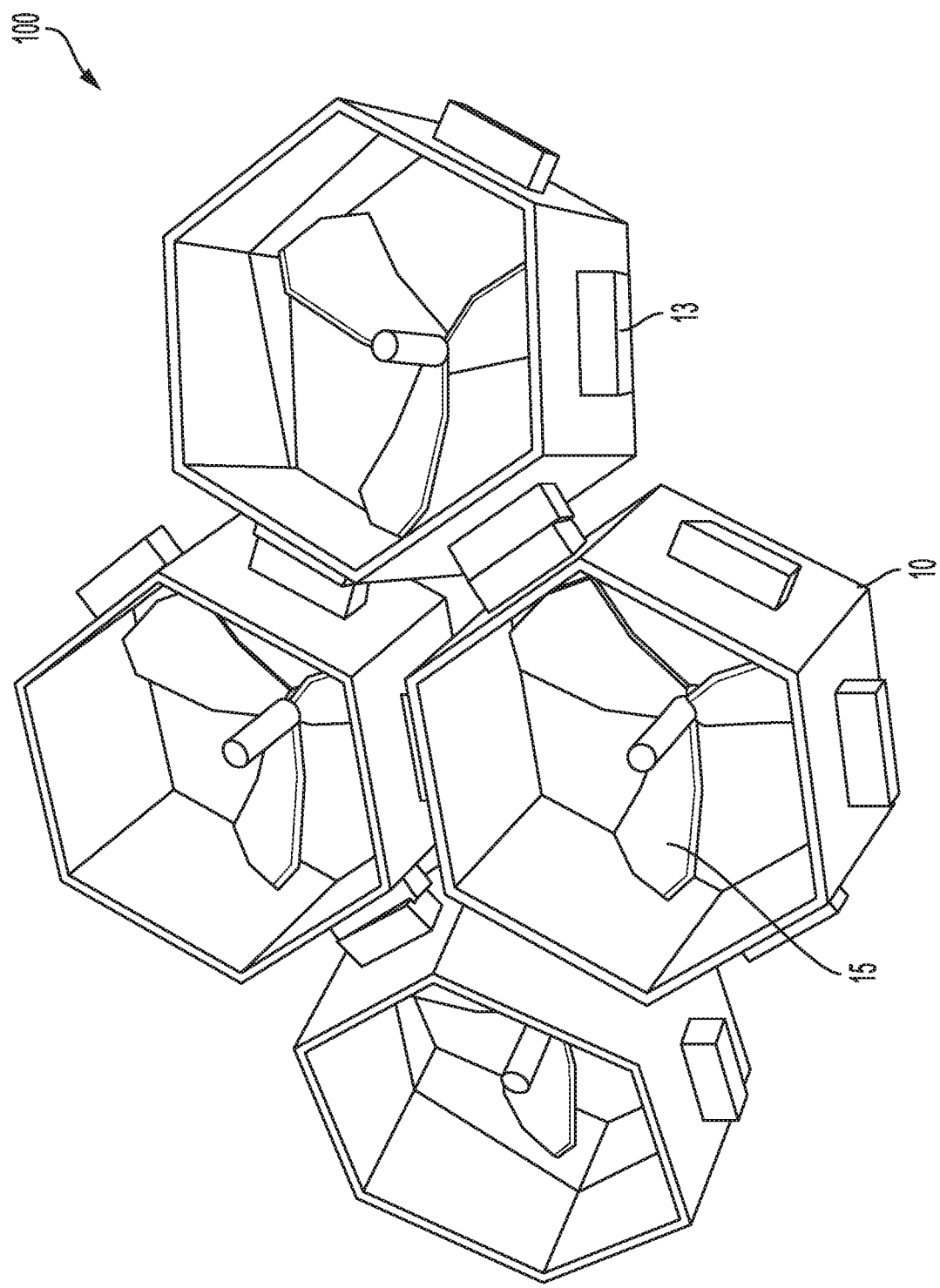
Figure 4E:
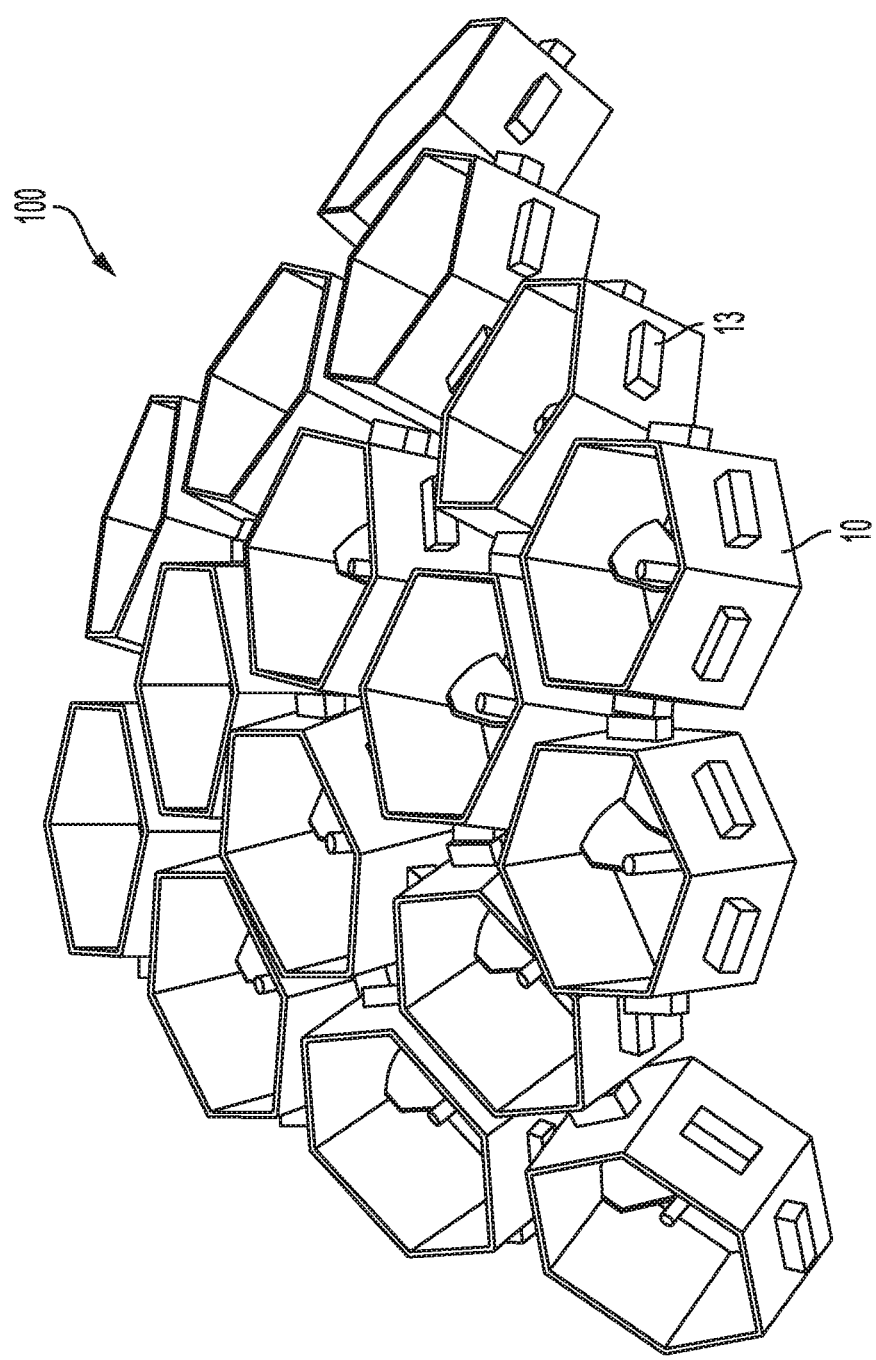
Figure 4F:
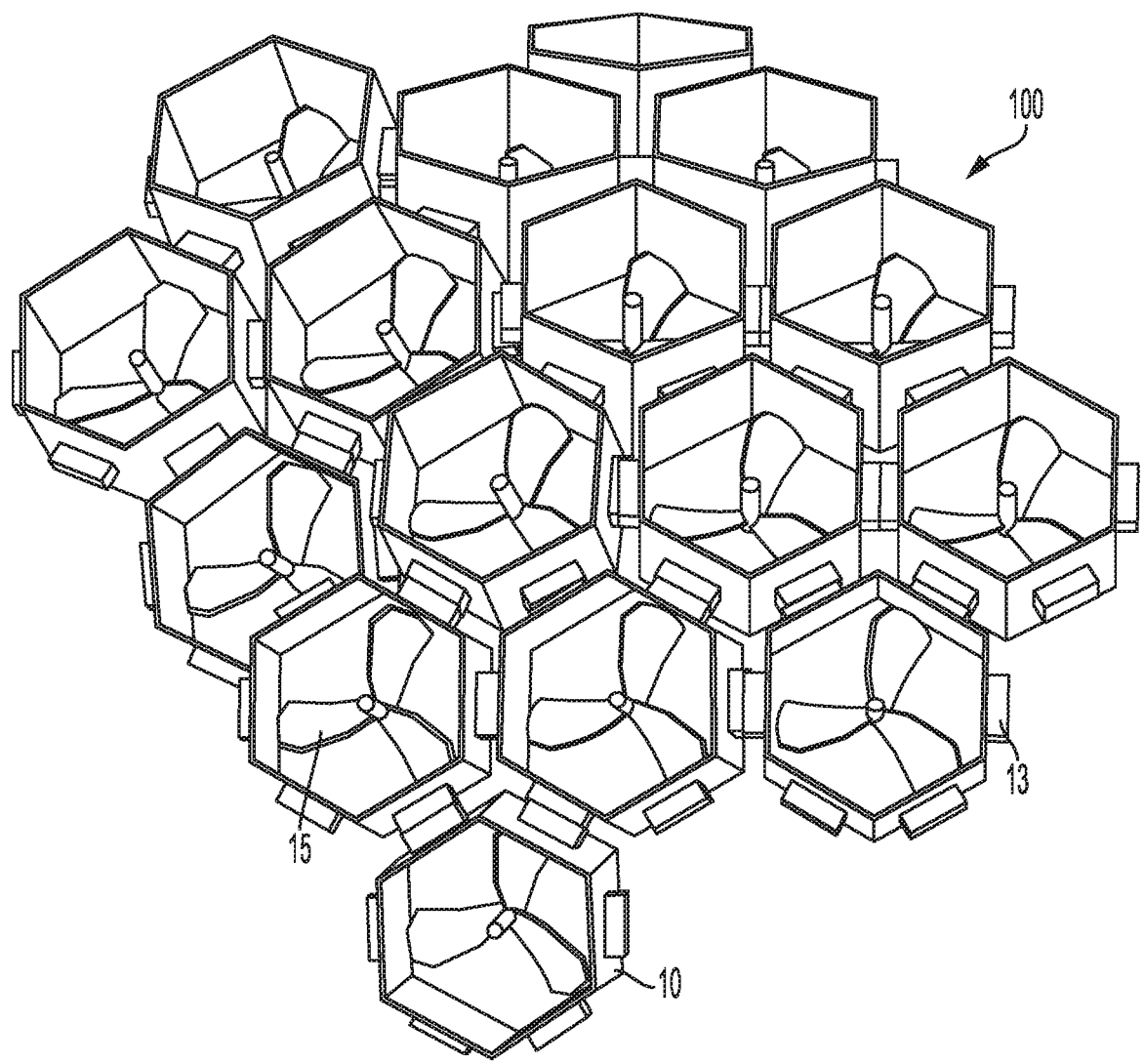

Moreover, FIGS. 4B-4C specifically illustrate embodiments in which each of the plurality of interconnectable tiles 10 comprise shutters 19 that may be selectably configurable between open configurations and a closed configuration. Specifically, in the embodiments shown in FIGS. 4B-4C, the shutters 19 of each of the plurality of interconnectable tiles 10 are in a partially open configuration. Moreover, as shown, the shutters are slidably (e.g., pivotably slidable) secured relative to the frame 11 of the interconnectable tiles 10, such that the shutters 19 may slide between an open configuration and a closed configuration. However, as discussed herein, the shutters 19 may be hinged, so as to redirect fluid flow from the interior of the interconnectable tile 10 (e.g., the flow produced at least in part by thrust units).

While many configurations of interconnected surfaces 100 and subsets (e.g., small numbers of interconnectable tiles 10) are possible and none is excluded here (explicitly or implicitly), certain arrangements of thrust units (e.g., motors 14 and corresponding propellers 15) within interconnectable tiles 10 have been found to offer advantages. For example, in the exemplary embodiment of FIGS. 10A-10H, small subdivisions of an interconnected surface 100 comprise at least four interconnectable tiles 10 (which may be independently controllable to provide a distributed control model for the small subdivisions of the interconnected surfaces 100) that are mechanically connected to form joints therebetween to provide full attitude and thrust control without any counteracting torque effect. As examples shown in FIG. 10A-10H, an interconnected surface 100 may comprise 4 triangular interconnectable tiles 10 attached relative to one another as shown in FIG. 10A. The interconnectable tiles 10 of the interconnected surface 100 of FIG. 10A may be secured to relative to other, identically configured interconnected surface 100 to form a larger interconnected surface 100, such as that shown schematically in FIG. 10E. As another example, an interconnected surface 100 may comprise 4 square interconnectable tiles 10 attached relative to one another as shown in the configuration of FIG. 10B. The interconnected surfaces 100 of FIG. 10B may be attached relative to other interconnected surfaces 100 to form a larger interconnected surface 100, such as that shown in FIG. 10F. As yet another example, an interconnected surface 100 may comprise 4 hexagonal interconnectable tiles attached relative to one another as shown in FIG. 10C. The interconnected surfaces 100 of FIG. 10C may be attached relative to other interconnected surfaces 100 to form a larger interconnected surface 100, such as that shown in FIG. 10G. In other embodiments, an interconnected surface 100 may comprise 7 hexagonal interconnected surfaces 100, such as that shown in FIG. 10D. The interconnected surfaces 100 of FIG. 10D may be attached relative to one another to form a larger interconnected surface 100, such as that shown in FIG. 10H. It should be understood that the illustrated embodiments of FIGS. 10A-10H are merely examples, and other configurations may be provided in accordance with various embodiments.

Such reconfigurability can enable a broad range of applications, such as switching between an interconnected surface 100 and a swarm to provide service to monitor a broad area (e.g., a sea-floor) in a short period of time. As other examples, reconfiguration of interconnectable tiles between swarm and interconnected surface 100 configurations enable those interconnectable tiles 10 to move through narrow and/or difficult to access areas, to provide redundancy in hazardous operational areas or in search and rescue operations, such as in sunken ships or other structures where the potential for multiple unit failure or damage is high, while maintaining the ability to form a larger vehicles embodied as an interconnected surface 100.

In various embodiments, a large array of small, substantially similar interconnectable tiles 10 configured for independent control of the power and direction of operation of the propeller (or other thrust unit) may be assembled into an interconnected surface 100. Such an interconnected surface 100 may be internally rigid or flexible, or a combination thereof (e.g., having one or more rigid joints and one or more flexible joints), or having joints with dynamically adjustable rigidity. Both present useful mechanical and fluid-dynamic properties not achievable with existing vehicles. For example, rigid interconnected surfaces, such as interconnected surfaces formed into a hull-shape having distributed thrust vectors that may be adjusted independently, thereby enabling the performance of a broad range of dynamic maneuvers, movements, and attitude control actions in a very seamless and effective fashion. Furthermore, such interconnected surfaces 100 utilizing a large number of small, independently controllable interconnectable tiles 10 with independently controllable thrust units provides a more robust overall vehicle in the case of failure of one or more individual interconnectable tiles 10.

In various embodiments, the plurality of interconnectable tiles 10 may be configured for operation collectively as an interconnected surface 100, collectively as a swarm, or individually as separate interconnectable tiles 10. In a swarm configuration, the plurality of interconnectable tiles 10 remain physically detached from one another, but operate collectively, so as to maintain desired distances between adjacent interconnectable tiles 10 within the swarm. In yet other embodiments, a plurality of interconnected surfaces 100 each comprising a plurality of interconnectable tiles 10 may operate collectively as a swarm, so as to maintain a desired distance between adjacent interconnected surfaces 100.

With reference again to FIG. 9, interconnectable tiles 10 and/or interconnected surfaces 100 may be configured for dynamic reconfiguration during operation. For example, one or more interconnectable tiles 10 may be configured to join relative to one another mid-operation to form an interconnected surface 100. Similarly, one or more interconnected surfaces 100 may join relative to one another mid-operation to form a larger interconnected surface 100.

When one or more interconnectable tiles 10 (whether individually or as an interconnected surface 100) join relative to other interconnected surfaces 100 mid-operation, the interconnectable tiles 10 may utilize one or more sensors (e.g., proximity sensors, vision sensors, and/or the like) to detect the presence of a nearby other interconnectable tile 10 for connection therewith. As the interconnectable tiles 10 approach one another, the onboard controllers of the interconnectable tiles 10 monitor relative movement of respective interconnectable tiles 10, for example, via SONAR, via electromagnetic sensors (if applicable), via vision sensors, and/or the like. As the interconnectable tiles 10 approach one another, the interconnectable tiles 10 are configured to engage connectors of respective vehicles to form joints therebetween. As discussed herein the connectors may comprise press-fit connectors configured to engage and form joints therebetween upon application of appropriate force. In other embodiments, the connectors may comprise actuators (or other active elements) configured to be engaged upon a trigger event (e.g., upon detecting that the connectors are pressed together) to form a joint. The action of connectors to form/detach from joints may, in certain embodiments, be aided or guided at least in part through wireless communications between the adjacent interconnectable tiles 10 (e.g., based at least in part on a strength of a wireless communication signal, indicative of a distance between interconnectable tiles 10, based at least in part on the content of a wireless communication, which may indicate whether another interconnectable tile 10 has detected contact between interconnectable tiles 10, and/or the like).

Moreover, the interconnected surfaces 100 may be configured to detach mid-operation in certain embodiments. As discussed above, the joints may be formed by actuatable connectors that may be disengaged mid-operation (e.g., by controlling an actuator within the connectors to disengage the connectors). Accordingly, one or more interconnectable tiles 10 and/or interconnected surfaces 100 may be configured to detach from one another, so as to enable independent movement of the interconnectable tiles and/or interconnected surfaces 100. For example, the interconnectable tiles 10 of an interconnected surface 100 may be configured to disengage from one another to form a swarm mid-operation (e.g., a swarm of a plurality of separated interconnectable tiles 10 or a swarm of a plurality of smaller interconnected surfaces 100). As another example, the interconnectable tiles 10 may be configured to disengage from one another to accomplish independent tasks (e.g., a smaller interconnected surface 100 may detach from a larger interconnected surface 100 to perform tasks away from the larger interconnected surface 100).

Similarly, the interconnectable tiles 10 of an interconnected surface 100 may be configured to detach mid-operation and reattach mid-operation, for example, to reconfigure the shape of an interconnected surface 100. As just one example, an interconnected surface 100 operable within a marine environment may be configured to remain in a first configuration optimized for efficient travel through water during a first period of time (e.g., until arrival at a desired destination), and to reconfigure into a second configuration optimized for object configuration during a second period of time (e.g., after arrival at the desired destination). It should be understood that any of a variety of configurations may be provided in accordance with certain embodiments.

Example Use Cases

Interconnectable tiles and/or interconnected surfaces 100 as discussed herein may be utilized in various implementations, such as surveillance implementations, object delivery implementations, object manipulation implementations, waterflow manipulation, search and rescue, dynamically deployable communication hub or base stations, and/or the like.

In surveillance implementations, one or more interconnectable tiles 10 may comprise a camera, microphone, or other surveillance devices. In other embodiments, one or more interconnectable tiles 10 may be configured to support a camera, microphone or other surveillance devices (e.g., an interconnectable tile 10 may independently support a camera or microphone, or a plurality of interconnectable tiles 10 forming an interconnected surface 100 may be configured to collectively support a camera or microphone).

To conduct surveillance, a plurality of interconnectable tiles 10 may operate collectively to support one or more surveillance devices during transit to a surveillance destination. For example, such surveillance may be embodied as underwater submarine surveillance to be conducted over a long period of time (e.g., a period of time not suitable for a human to be exposed to a submarine environment). The plurality of interconnectable tiles 10 may operate as physically separate devices (e.g., as a swarm), the plurality of interconnectable tiles 10 may operate in one or more interconnected surfaces 100, or a combination thereof (e.g., a swarm of interconnected surfaces 100). In certain embodiments, the plurality of interconnectable tiles 10 may be configured to change between various configurations (e.g., between a swarm configuration and a single interconnected surface 100 configuration, or vice versa) depending on a phase of surveillance. For example, the plurality of interconnectable tiles 10 may be configured to travel to a surveillance destination in a first configuration (e.g., as a single interconnected surface 100) and to transition to a second configuration upon arrival at a surveillance destination (e.g., a plurality of physically separate interconnected surfaces 100 and/or a plurality of physically separate interconnectable tiles 10). As just one example, a plurality of interconnectable tiles 10 may be configured to travel to a surveillance destination as a single interconnected surface 100, and to split into a plurality of smaller interconnected surfaces 100 upon arrival at the surveillance destination, for example, to surround the surveillance destination to collect additional surveillance data via surveillance equipment supported by the interconnected surfaces 100.

As yet another example, the plurality of interconnectable tiles 10 may travel to a surveillance destination as a plurality of physically separate interconnectable tiles 10, for example, to minimize the possibility of detection of all interconnectable tiles 10 travelling to the surveillance destination, and/or to facilitate maneuvering the interconnectable tiles 10 through one or more small openings, apertures, and/or the like (e.g., to enter a sunken ship or other structure) along the travel path of the interconnectable tiles 10 to the surveillance destination. Upon arrival at the surveillance destination, the plurality of interconnectable tiles 10 may be configured to reconfigure into one or more interconnected surfaces 100, for example, to increase the stability of the interconnectable tiles 10 supporting the surveillance equipment. As yet another example, upon arrival at the surveillance destination, the plurality of interconnectable tiles 10 may be configured to reconfigure into one or more interconnected surfaces 100, wherein the interconnected surfaces 100 each comprise a first interconnectable tile 10 comprising a camera (or other surveillance equipment) and a second interconnectable tile 10 comprising a wireless data transmitter configured for long-range wireless communication to convey surveillance data collected by the camera to a separate location. In such embodiments, the plurality of interconnectable tiles 10 may be configured for data transmission (e.g., wired data transmission) therebetween, so as to facilitate data transmission from the camera (or other surveillance equipment) to the wireless data transmitter.

As another example use case, an interconnected surface 100 may be utilized for object retrieval and/or object manipulation, for example, utilizing one or more interconnectable tiles 10 to contact or otherwise engage an object, and utilizing other interconnectable tiles 10 within the same interconnected surface 100 as additional thrust, so as to enable the interconnected surface 100 as a whole capable of lifting, spinning, flipping, turning, or otherwise manipulating an object. In certain embodiments, object manipulation and/or object retrieval may be performed via actuatable arms connected to one or more interconnectable tiles 10 and/or via faces of one or more interconnectable tiles 10 themselves. The object manipulation use case may be a part of an object retrieval use case, or may be a separate use case, such as in industrial settings, manufacturing settings, and/or the like.

In one example, parts of the flexible interconnected surface can conform to the object to be manipulated or handled and effectively grab it. The ability to grab objects can be further enhanced by generating a suction force induced by one or more thrust units, which enables a grip (e.g., having an adjustable grip strength determined based at least in part on the suction force strength) enabling the interconnected surface 100 to move, lift, and/or manipulate the target object. As discussed above, thrust units of certain interconnectable tiles 10 may be configured to reverse direction so as to reverse the direction of provided thrust of the interconnectable tile 10. Such configurations enable interconnectable tiles 10 to create a suction force by creating a reverse thrust against a face of an object to be manipulated. The amount of thrust (or suction) may be adjusted by changing the output of the thrust unit, so as to enable rotation, lift, release, or other manipulation movements of an object by one or more interconnectable tiles 10 within an interconnected surface 100. In certain embodiments, the one or more interconnectable tiles 10 may comprise one or more sensors (e.g., disposed within a sensor array) configured to detect appropriate holding forces to perform various object manipulation movements. For example, one or more pressure sensors, contact sensors, and/or the like, may be configured to detect when an interconnectable tile 10 is in contact with an object, to detect if the object is slipping relative to the interconnectable tile 10 (e.g., indicating that a greater suction/holding force is necessary for object holding), and/or the like, so as to perform highly precise object manipulation movements.

In certain embodiments, one or more interconnectable tiles 10 within an interconnected surface 100 may comprise one or more object manipulation features, such as hooks, high-friction pads, actuatable claws, and/or the like configured for engaging one or more surfaces of an object. In certain embodiments, the manipulation features may be specifically configured for engaging a particular shape of object (e.g., a cube, a panel in a sunken-ship retrieval process, and/or the like). In other embodiments, the manipulation features may be configured for engaging a variety of shapes, such as via a conformable engagement feature.

In object manipulation settings, an interconnected surface 100 may be characterized by flexible joints between at least a portion of interconnectable tiles 10 within the interconnected surface 100. The flexible joints enable relative movement of interconnectable tiles 10 within the interconnected surface 100, thereby enabling at least a portion of interconnectable tiles 10 to adjust their position relative to the object, thereby enabling engagement between the interconnected surface 100 and the object so as to enable object manipulation. Moreover, the controllers of the included interconnectable tiles 10 are configured to utilize object manipulation movement models for controlling included thrust units, thereby enabling movement patterns for performing one or more object manipulation tasks, such as lifting an object, lifting one side of an object (e.g., to flip an object), moving opposite sides of an object (e.g., to spin an object), and/or the like. Other object manipulation tasks may be performed in accordance with appropriate control models executed by the one or more controllers of the interconnectable tiles 10 (e.g., in a distributed control system or a centralized control system).

As yet another example usage, an interconnected surface 100 may be utilized for waterflow manipulation, such as to redirect a flow of water to a desired location. As just one specific example, an interconnected surface 100 operable within a marine environment may be configured to redirect and/or contain the flow of chemical leak within an open-water environment (e.g., to direct oil floating away from an oil spill within an oceanic environment) so as to facilitate cleanup efforts. In certain embodiments, an interconnected surface 100 may be utilized to redirect a water flow within a closed environment (e.g., within a pond). As other examples, one or more interconnected surfaces 100 may operate in concert to redirect a water flow within an open environment, such as redirecting a flow of water within an ocean, a river, and/or the like.

In such embodiments, an interconnected surface 100 may be implemented as a flexible interconnected surface 100, to at least partially surround a perimeter of water (or other fluid) to be redirected. In other embodiments, an interconnected surface 100 may be a rigid interconnected surface 100, configured for redirecting a quantity of water, without regard to the source of the water (e.g., redirecting a flow of water within a river toward a power generation station). For example, certain interconnectable tiles 10 may be positioned to provide supporting thrust for the interconnected surface 100 to maintain a desired position of the interconnected surface 100 (e.g., to counteract forces generated by the waterflow manipulation thrust units), while others of the interconnectable tiles 10 within the interconnected surface 100 are configured to redirect a water flow as desired.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A submerging interconnectable tile operable within a liquid, the interconnectable tile comprising:
   a frame defining opposing open ends and having one or more connectors configured to engage external connectors of at least one adjacent interconnectable tile to form a joint between the frame and the at least one adjacent interconnectable tile;
   a thrust unit secured within the frame and configured to provide thrust for the submerging tile at least in part by pulling liquid through the opposing open ends of the frame;
   a controller secured within the frame and configured to transmit control signals to the thrust unit; and
   one or more shutters operably connected with the frame, wherein the one or more shutters are configurable between one or more open positions and a closed position to at least partially seal an open end of the opposing open ends of the frame to dynamically control fluid dynamic interactions with a liquid.

2. The submerging interconnectable tile of claim 1, further comprising a buoyancy adjustment system configured to change the buoyancy of the submerging interconnectable tile.

3. The submerging interconnectable tile of claim 1, wherein the one or more shutters are embodied as one or more first shutters operably connected with the frame at a first open end of the opposing open ends of the frame, wherein the interconnectable tile further comprises one or more second shutters operably connected with the frame at a second open end of the opposing open ends of the frame, and wherein the one or more first shutters and the one or more second shutters are collectively configured to at least partially seal an interior of the frame defined between the opposing open ends.

4. The submerging interconnectable tile of claim 1, further comprising an acoustic-based communication system in communication with the controller.

5. The submerging interconnectable tile of claim 1, further comprising SONAR sensing components in communication with the controller.

6. The submerging interconnectable tile of claim 1, wherein the thrust unit is secured within the frame via one or more attitude adjustment mechanisms configured to provide vectored thrust control within the interconnectable tile.

7. The submerging interconnectable tile of claim 1, wherein the one or more connectors are configured to form a rigid joint when engaged with external connectors of at least one adjacent interconnectable tile.

8. The submerging interconnectable tile of claim 1, wherein the one or more connectors are configured to form a flexible joint when engaged with external connectors of at least one adjacent interconnectable tile.

9. The submerging interconnectable tile of claim 1, wherein the one or more connectors are configured to form a dynamically adjustable joint when engaged with external connectors of at least one adjacent interconnectable tile, wherein the dynamically adjustable joint has a dynamically controllable rigidity.

10. The submerging interconnectable tile of claim 1, wherein the controller is configured to provide control signals to the thrust unit based at least in part on master control signals received by the controller.

11. The submerging interconnectable tile of claim 1, wherein the one or more connectors comprise physical data connectors, and the controller is configured to communicate with controllers of connected adjacent interconnectable tiles via the physical data connectors.

12. A submerging interconnected surface comprising:
    a plurality of submerging interconnectable tiles each comprising:
      a frame having one or more connectors configured to engage external connectors of at least one adjacent interconnectable tile to form a joint between the frame and the at least one adjacent interconnectable tile;
      an independently controllable thrust module;
      a controller secured within the frame and configured to transmit control signals to the thrust module and to communicate with other interconnectable tiles within the interconnected surface via one or more communication protocols.

13. The submerging interconnected surface of claim 12, wherein the frame of each of the plurality of submerging interconnectable tiles define opposing open ends, and each of the plurality of interconnectable tiles further comprise one or more first shutters operably connected with the frame at a first open end of the opposing open ends of the frame, wherein the one or more first shutters are configurable between:
    one or more open positions to provide attitude adjustment for the interconnectable tile while liquid is moving through the opposing open ends of the frame; and
    a closed position to at least partially seal the first open end of the frame to dynamically control fluid dynamic interactions with liquid.

14. The submerging interconnected surface of claim 13, wherein the controller of at least one of the plurality of interconnectable tiles is configured to configure the first shutters to a closed configuration to provide decreased drag across a face of the submerging interconnected surface.

15. The submerging interconnected surface of claim 12, wherein the independently controllable thrust modules of each of the plurality of interconnectable tiles comprise at least one marine propeller.

16. The submerging interconnected surface of claim 12, wherein the controllers of the plurality of interconnectable tiles are collectively configured to depower at least one of the independently controllable thrust units.

17. The submerging interconnected surface of claim 12, wherein each of the interconnectable tiles additionally comprise a buoyancy control system, and wherein the controllers of the plurality of interconnectable tiles are collectively configured to modify the buoyancy of the submerging interconnected surface by independently operating the buoyancy control systems of the plurality of interconnectable tiles.

18. The submerging interconnected surface of claim 12, wherein each of the interconnectable tiles further comprises an onboard power supply.

19. The submerging interconnected surface of claim 12, wherein adjacent interconnectable tiles of the plurality of interconnectable tiles are connected via a flexible joint.

20. The submerging interconnected surface of claim 12, wherein adjacent interconnectable tiles of the plurality of interconnectable tiles are connected via a rigid joint.

21. The submerging interconnected surface of claim 12, wherein adjacent interconnectable tiles of the plurality of interconnectable tiles are connected via a dynamically adjustable joint.

22. An interconnected surface configured for operation in a zero-gravity environment, the interconnected surface comprising:
    a plurality of interconnectable tiles configured for operation in a zero-gravity environment, wherein each interconnectable tile of the plurality of interconnectable tiles comprises:
        a frame having one or more connectors configured to engage external connectors of at least one adjacent interconnectable tile to form a joint between the frame and the at least one adjacent interconnectable tile;
        an independently controllable thrust module operable within a zero-gravity environment;
        a controller secured within the frame and configured to transmit control signals to the thrust module and to communicate with other interconnectable tiles within the interconnected surface via one or more communication protocols.

23. The interconnected surface configured for operation in a zero-gravity environment of claim 22, wherein the independently controllable thrust modules of each of the plurality of interconnectable tiles comprises an ion drive.

24. The interconnected surface configured for operation in a zero-gravity environment of claim 22, wherein adjacent interconnectable tiles of the plurality of interconnectable tiles are connected via a flexible joint.

25. The interconnected surface configured for operation in a zero-gravity environment of claim 22, wherein adjacent interconnectable tiles of the plurality of interconnectable tiles are connected via a rigid joint.

26. The interconnected surface configured for operation in a zero-gravity environment of claim 22, wherein adjacent interconnectable tiles of the plurality of interconnectable tiles are connected via a dynamically adjustable joint.

27. The interconnected surface configured for operation in a zero-gravity environment of claim 22, wherein the thrust unit of each of the plurality of interconnectable tiles is secured within the frame via one or more attitude adjustment mechanisms configured to provide vectored thrust control within the interconnectable tile.

28. The interconnected surface configured for operation in a zero-gravity environment of claim 22, wherein one or more of the plurality of interconnectable tiles comprises a photovoltaic energy production system.

29. The interconnected surface configured for operation in a zero-gravity environment of claim 22, wherein one or more of the plurality of interconnectable tiles comprises at least one of a radio-frequency or microwave transceiver.

30. The interconnected surface configured for operation in a zero-gravity environment of claim 22, wherein the controllers of the plurality of interconnectable tiles are collectively configured to depower at least one of the independently controllable thrust units.

31. The interconnected surface configured for operation in a zero-gravity environment of claim 22, wherein each of the interconnectable tiles further comprises an onboard power supply.

* * * * *